US011088803B2

(12) United States Patent
Takano

(10) Patent No.: US 11,088,803 B2
(45) Date of Patent: Aug. 10, 2021

(54) TERMINAL APPARATUS, BASE STATION, METHOD AND RECORDING MEDIUM FOR PROCESSING UPLINK REFERENCE SIGNALS

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/309,117

(22) PCT Filed: Jun. 16, 2017

(86) PCT No.: PCT/JP2017/022383
§ 371 (c)(1),
(2) Date: Dec. 12, 2018

(87) PCT Pub. No.: WO2018/020899
PCT Pub. Date: Feb. 1, 2018

(65) Prior Publication Data
US 2019/0312705 A1 Oct. 10, 2019

(30) Foreign Application Priority Data
Jul. 29, 2016 (JP) .............................. JP2016-150168

(51) Int. Cl.
H04B 1/7143 (2011.01)
H04W 16/28 (2009.01)
(Continued)

(52) U.S. Cl.
CPC ......... H04L 5/0051 (2013.01); H04B 1/7143 (2013.01); H04B 7/0413 (2013.01);
(Continued)

(58) Field of Classification Search
CPC ..... H04L 5/0051; H04L 25/0226; H04B 7/08; H04B 7/0456; H04B 7/06; H04B 7/0617;
(Continued)

(56) References Cited

U.S. PATENT DOCUMENTS 9,300,495 B2 * 3/2016 Dahlman ............ H04L 27/2613
9,450,661 B2 9/2016 Yu et al.
(Continued)

FOREIGN PATENT DOCUMENTS

JP 2013-540396 A 10/2013
JP 2014-529213 A 10/2014
(Continued)

OTHER PUBLICATIONS

LG Electronics, "UL sounding RS Operation," 3GPP TSG RAN WG1 #52, R1-080994, Sorrento, Italy, Feb. 11-15, 2008, pp. 1-6. (Year: 2008).*
(Continued)

Primary Examiner — Un C Cho
Assistant Examiner — Lalita W Pace
(74) Attorney, Agent, or Firm — Xsensus LLP

(57) ABSTRACT

[Object] To provide the uplink reference signal for beam tracking.
[Solution] A terminal apparatus, including: a communication unit configured to perform communication with a base station configured to form beams and perform communication; and a control unit configured to transmit a first uplink reference signal and a second uplink reference signal which has a narrower target frequency bandwidth and a shorter transmission period than the first uplink reference signal.

18 Claims, 16 Drawing Sheets

(51) Int. Cl.
| | |
|---|---|
| *H04L 5/00* | (2006.01) |
| *H04B 7/0413* | (2017.01) |
| *H04B 7/06* | (2006.01) |
| *H04L 25/02* | (2006.01) |
| *H04W 72/04* | (2009.01) |
| *H04B 7/0456* | (2017.01) |
| *H04B 7/08* | (2006.01) |

(52) U.S. Cl.
CPC ............. *H04B 7/0456* (2013.01); *H04B 7/06* (2013.01); *H04B 7/0617* (2013.01); *H04B 7/08* (2013.01); *H04L 25/0226* (2013.01); *H04W 16/28* (2013.01); *H04W 72/04* (2013.01); *H04W 72/046* (2013.01)

(58) Field of Classification Search
CPC ... H04B 7/0413; H04B 1/7143; H04W 72/04; H04W 72/046; H04W 16/28
See application file for complete search history.

(56) References Cited

U.S. PATENT DOCUMENTS

| | | | | |
|---|---|---|---|---|
| 9,780,860 | B1* | 10/2017 | Sung | H04B 7/0632 |
| 10,075,271 | B2* | 9/2018 | Soriaga | H04L 25/0398 |
| 2009/0042616 | A1 | 2/2009 | Teo et al. | |
| 2010/0220614 | A1* | 9/2010 | Seong | H04L 5/0051 |
| | | | | 370/252 |
| 2010/0309852 | A1* | 12/2010 | Li | H04L 5/0048 |
| | | | | 370/328 |
| 2011/0081929 | A1* | 4/2011 | Matsumoto | H04L 5/001 |
| | | | | 455/507 |
| 2011/0098054 | A1* | 4/2011 | Gorokhov | H04B 7/024 |
| | | | | 455/452.1 |
| 2012/0113967 | A1 | 5/2012 | Smith et al. | |
| 2012/0218967 | A1* | 8/2012 | Noh | H04W 24/00 |
| | | | | 370/329 |
| 2013/0114564 | A1* | 5/2013 | Ogawa | H04L 5/0012 |
| | | | | 370/330 |
| 2013/0222182 | A1* | 8/2013 | Nakasato | H04L 27/2613 |
| | | | | 342/368 |
| 2013/0329660 | A1* | 12/2013 | Noh | H04L 5/0035 |
| | | | | 370/329 |
| 2013/0344881 | A1* | 12/2013 | Nakasato | H04L 5/0023 |
| | | | | 455/450 |
| 2014/0112168 | A1 | 4/2014 | Chen et al. | |
| 2014/0211737 | A1* | 7/2014 | Takeda | H04W 52/146 |
| | | | | 370/329 |
| 2014/0302784 | A1* | 10/2014 | Kim | H04W 8/005 |
| | | | | 455/41.2 |
| 2015/0009951 | A1* | 1/2015 | Josiam | H04L 25/0224 |
| | | | | 370/330 |
| 2016/0080060 | A1* | 3/2016 | Yu | H04B 7/0626 |
| | | | | 455/452.2 |
| 2016/0081084 | A1* | 3/2016 | Blankenship | H04W 4/70 |
| | | | | 370/329 |
| 2017/0033908 | A1* | 2/2017 | Hwang | H04L 5/0053 |
| 2018/0069673 | A1* | 3/2018 | Soriaga | H04L 5/0048 |
| 2018/0198582 | A1* | 7/2018 | Andersson | H04L 5/0007 |
| 2019/0075561 | A1* | 3/2019 | Tang | H04L 5/0053 |

FOREIGN PATENT DOCUMENTS

| | | |
|---|---|---|
| JP | 2015-164281 A | 9/2015 |
| JP | 2016-500982 A | 1/2016 |
| WO | 2011/135788 A1 | 11/2011 |

OTHER PUBLICATIONS

"CSI Acquisition Framework for Massive MIMO in New Radio," 3GPP TSG RAN WG1 Meeting #85 R1-164374, Huawei, HiSilicon, pp. 1-6 (May 23-27, 2016).
English language translation of International Search Report and Written Opinion for PCT application No. PCT/JP2017/022383, dated Sep. 5, 2017.
Extended European Search Report dated Jul. 15, 2019, issued in corresponding European Patent Application No. 17833909.9.
Japanese Office Action dated Sep. 29, 2020, in corresponding Japanese Patent Application No. 2016-150168.

* cited by examiner

TERMINAL APPARATUS, BASE STATION, METHOD AND RECORDING MEDIUM FOR PROCESSING UPLINK REFERENCE SIGNALS

CROSS-REFERENCE TO RELATED APPLICATIONS

This application is a National Stage Application based on PCT/JP2017/022383, filed on Jun. 16, 2017, and claims priority to Japanese Patent Application No. 2016-150168, filed on Jul. 29, 2016, the entire contents of each of which being incorporated herein by reference.

TECHNICAL FIELD

The present disclosure relates to a terminal apparatus, a base station, a to method and a recording medium.

BACKGROUND ART

In recent years, 5G which is a next generation communication standard has been discussed in the Third Generation Partnership Project (3GPP). Communication technology constituting 5G is also called New Radio Access Technology (NR).

One of the study items of 3GPP Release 14 is multiple-input and multiple-output (MIMO) for NR. MIMO is a technique for performing beam forming using a plurality of antennas, and includes 3D (or full dimension)-MIMO capable of performing beam forming in three-dimensional directions, massive-MIMO using a plurality of antennas, and the like. Improvement in the accuracy of a beam tracking technique for continuously providing appropriate beams to a user terminal is required in MIMO.

For example, a technique for deciding beams for a user apparatus on the basis of feedback information from a user apparatus for beam forming is disclosed in the following Patent Literature 1.

CITATION LIST

Patent Literature

Patent Literature 1: JP 2015-164281A

DISCLOSURE OF INVENTION

Technical Problem

However, the technique related to beam tracking proposed in Patent Literature or the like is still under discussion, and it is difficult to say that sufficient proposals have been made. For example, a technique related to an uplink reference signal (RS) for beam tracking is also a technique that has not been sufficiently proposed.

Solution to Problem

According to the present disclosure, there is provided a terminal apparatus, including: a communication unit configured to perform communication with a base station configured to form beams and perform communication; and a control unit configured to transmit a first uplink reference signal and a second uplink reference signal which has a narrower target frequency bandwidth and a shorter transmission period than the first uplink reference signal.

In addition, according to the present disclosure, there is provided a base station, including: a communication unit configured to form beams and perform communication with a terminal apparatus, and a control unit configured to perform reception of a first uplink reference signal and a second uplink reference signal which has a narrower target frequency bandwidth and a shorter transmission period than the first uplink reference signal from the terminal apparatus and transmission of first setting information for the second uplink reference signal to the terminal apparatus.

In addition, according to the present disclosure, there is provided a method, including: performing communication with a base station configured to form beams and perform communication; and transmitting, by a processor, a first uplink reference signal and a second uplink reference signal which has a narrower target frequency bandwidth and a shorter transmission period than the first uplink reference signal.

In addition, according to the present disclosure, there is provided a method, including: forming beams and performing communication with a terminal apparatus; and performing, by a processor, reception of a first uplink reference signal and a second uplink reference signal which has a narrower target frequency bandwidth and a shorter transmission period than the first uplink reference signal from the terminal apparatus and transmission of first setting information for the second uplink reference signal to the terminal apparatus.

In addition, according to the present disclosure, there is provided a recording medium having a program recorded thereon, the program causing a computer to function as: a communication unit configured to perform communication with a base station configured to form beams and perform communication; and a control unit configured to transmit a first uplink reference signal and a second uplink reference signal which has a narrower target frequency bandwidth and a shorter transmission period than the first uplink reference signal.

In addition, according to the present disclosure, there is provided a recording medium having a program recorded thereon, the program causing a computer to function as: a communication unit configured to form beams and perform communication with a terminal apparatus; and a control unit configured to perform reception of a first uplink reference signal and a second uplink reference signal which has a narrower target frequency bandwidth and a shorter transmission period than the first uplink reference signal from the terminal apparatus and transmission of first setting information for the second uplink reference signal to the terminal apparatus.

Advantageous Effects of Invention

As described above, according to the present disclosure, the uplink reference signal for beam tracking is provided. Note that the effects described above are not necessarily limitative. With or in the place of the above effects, there may be achieved any one of the effects described in this specification or other effects that may be gasped from this specification.

MODE(S) FOR CARRYING OUT THE INVENTION

Figure 1:
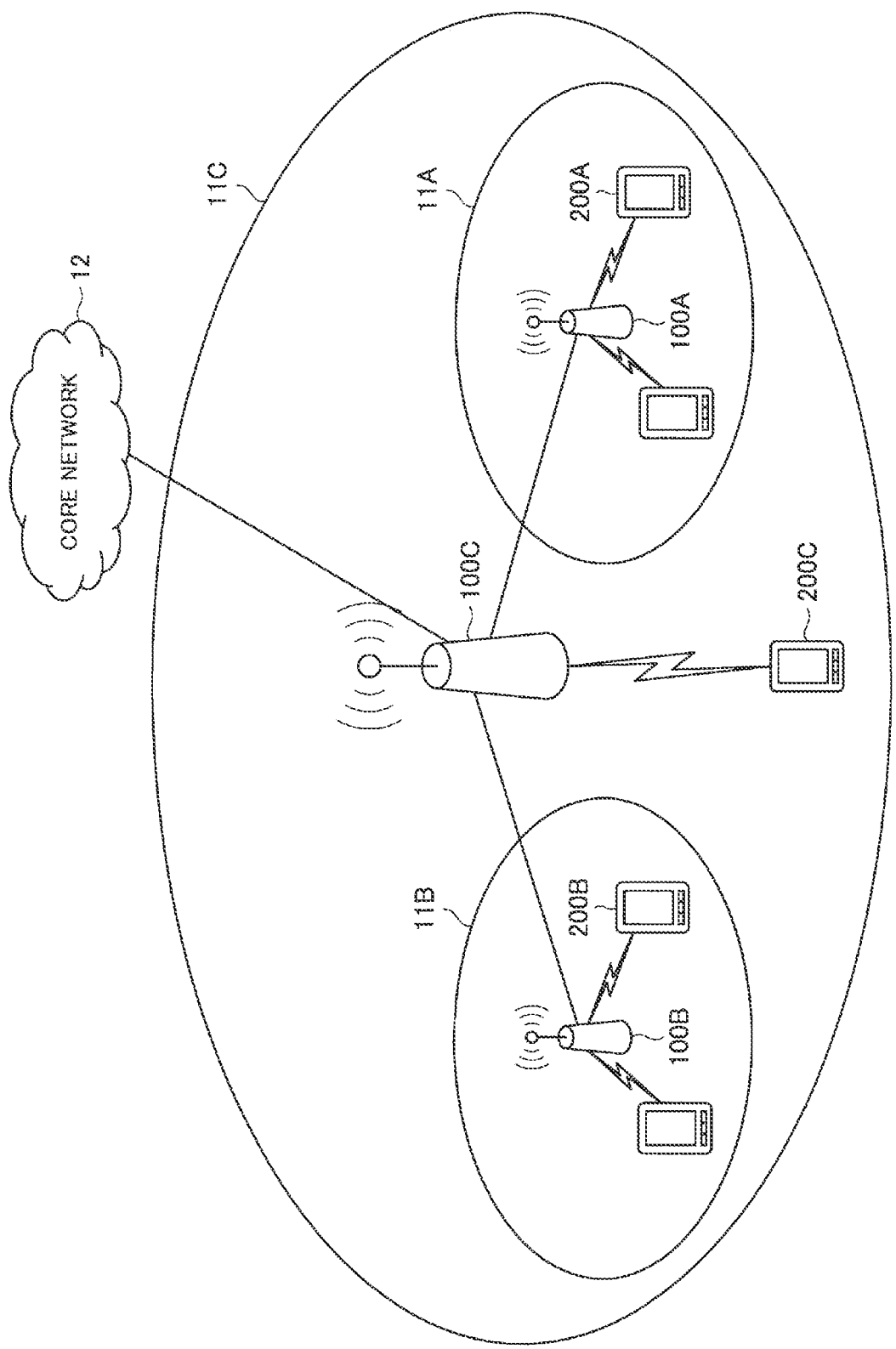
FIG. 1 is a diagram for describing an example of a configuration of a system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, in this specification and the appended drawings, elements having substantially the same function and structure may in some cases be distinguished by different letters appended to the same sign. For example, multiple elements having substantially the same function and structure are distinguished as base stations 100A, 100B, and 100C as appropriate. On the other band, when not particularly distinguishing each of multiple elements having substantially the same function and structure, only the same sign will be given. For example, the base stations 100A. 100B, and 100C will be simply designated the base stations 100 when not being particularly distinguished.

Further, the description will proceed in the following order.

1. System configuration example
2. Considerations related to beam tracking
2.1. Overview of beam tracking
2.2. SRS
2.3. Other
3. Configuration example of each apparatus
3.1. Configuration example of base station
3.2. Configuration of terminal apparatus
4. First embodiment
4.1. Technical problems
4.2. Technical features
5. Second Embodiment
5.1. Technical problems
5.2. Technical features
6. Application examples
7. Conclusion 1.1. System Configuration Example First, an example of a configuration of a system according to an embodiment of the present disclosure will be described with reference to FIG. 1. FIG. 1 is a diagram for describing an example of a configuration of a system according to the present embodiment. As illustrated in FIG. 1, a system 1 according to the present embodiment includes a base station 100, and a terminal apparatus 200.

The base station 100 is an apparatus which operates a cell 11 and provides radio communication service to the terminal apparatus 200 in the cell 11. As illustrated in FIG. 1, there may be a plurality of base stations 100, and the base stations 100A to 100C operate cells 11A to 11C, respectively, and provide radio communication services to the terminal apparatuses 200A to 200C, respectively. In the example illustrated in FIG. 1, the base stations 100A and 100B are small cell base stations, and the cells 11A and 11B are small cells. Further, the base station 100C is a macro cell base station, and the cell 11C is a macro cell. The macro cell base station 100C has a function of cooperatively controlling radio communication performed by the small cell base stations 100A and 100B subordinate thereto. Further, the base stations 100 are connected to be capable of communicating with each other and are connected via, for example, an X2 interface. Further, the base station 100 and a core network 12 are connected to be capable of communicating with each other and are connected via, for example, an S1 interface.

The terminal apparatus 200 is an apparatus communicating with the base station 100. Typically, the terminal apparatus 200 has high mobility and performs cell selection according to its movement. In addition, in a case in which beams are formed by the base station 100 or the terminal apparatus 200, beam tracking for forming appropriate beams according to the movement of the terminal apparatus 200 and performing communication is performed.

Hereinafter, the base station is also referred to as an evolved Node B (eNB) The base station 100 is not limited to a base station which is operated according to radio access technology in LTE and may be operated in accordance with radio access technology of 5G. In other words, the base station may be called by a name other than "eNB." Similarly, hereinafter, the terminal apparatus is also referred to as a user equipment (UE) or a user, but the terminal apparatus 200 is not limited to a terminal apparatus which is operated in accordance with radio access technology in LTE and may be operated in accordance with radio access technology of 5G.

A core network 12 includes a control node configured to control the base station 100. The core network 12 may include, for example, an evolved packet core (EPC) or a 5G architecture. The core network 12 is connected to a packet data network through a gateway device.

2. Considerations Related to Beam Tracking

Considerations related to beam tracking will be discussed below from different viewpoints.

2.1. Overview of Beam Tracking (Necessity of Beam Tracking)

It is assumed that an extremely large number of antennas (more specifically, antenna elements) such as, for example, 256 antennas in a 30 GHz band and 1,000 antennas in a 70 GHz band are installed in an eNB. It is possible to form sharper beams as the number of antenna elements increases. For example, it is possible to provide, for example, very sharp beams in which a half-value width (indicating a minimum degree at which a level of 3 dB drop occurs) is 1° or less from the eNB to the UE It is assumed that, in an environment in which very sharp beams are formed, the UE can easily leave the beams in a case in which the UE moves at a high speed (for example, the UE moves at 500 km/h). If the UE leaves the beams, it is difficult to transmit data from the eNB to the UE. Therefore, it is desirable that the beams be formed to be able to track the UE moving at a high speed as illustrated in FIG. 2.

Figure 2:
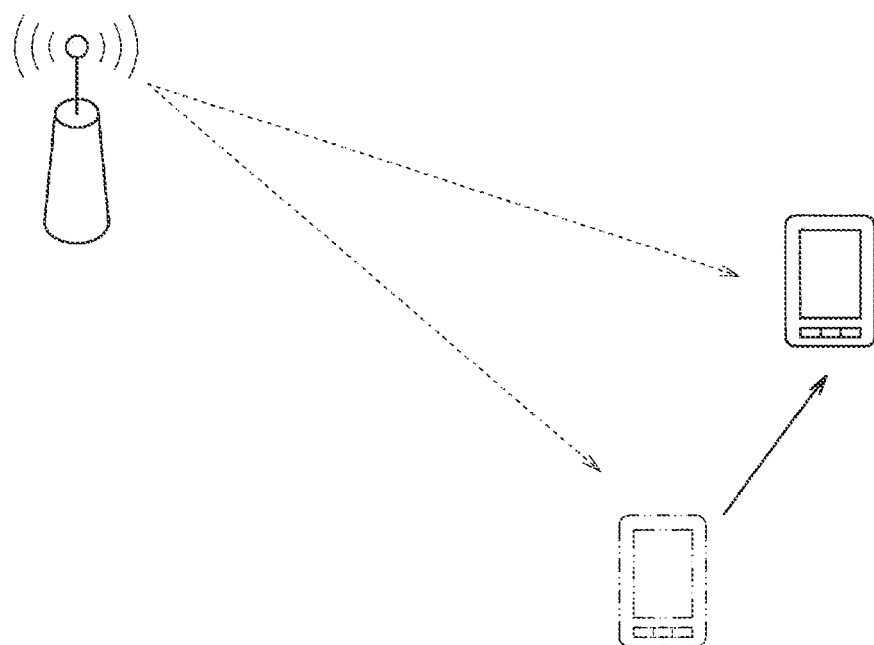
FIG. 2 is a diagram for describing considerations related to beam tracking.

FIG. 2 is a diagram for describing considerations related to beam tracking. As illustrated in FIG. 2, it is desirable to cause beams formed by the eNB to track the movement of the UE.

(Codebook-Based Beam Forming)

In LTE, it is unlikely for a mechanism that causes beams to be changed steplessly and rebuilds beams tracking a UE to be employed. This is because a calculation cost for rebuilding new beams occurs. In this regard, a mechanism for forming beams facing in as many directions as possible in advance from an eNB, selecting beams to be used for communication with a UE among the beams formed in advance, and providing the selected beams is employed in full dimension multi-input multi-output (FD-MIMO) of 3GPP Release 13. Such a mechanism is also referred to as codebook-based beam forming.

For example, in a case in which beams of 1° are prepared for 360° in a horizontal direction, 360 beams are prepared. In a case in which beams overlap by half, 720 beams are prepared. In a case in which beams is prepared similarly for −90° to +90° in a vertical direction, 360 beams corresponding to 180° are prepared.

In the codebook-based beam forming, beam tracking means continuously selecting beams suitable for communication with a UE among beams prepared in advance as a code book.

(Beam Tracking Based on Downlink Reference Signal)

In 3GPP RAN1 Release 13 FD-MIMO, beam selection was investigated. In this investigation, selection of beams suitable for communication with the UE by the eNB on the basis of a downlink beam-formed reference signal was investigated. Such a downlink reference signal is also referred to as a beam-formed channel state information-reference signal (CSI-RS). The eNB provides a plurality of beam-formed CSI-RSs (multiple beam-formed CSI-RSs) and communicates with the UE using beams corresponding to a reception result in the UE. A beam tracking procedure based on the beam-formed CSI-RS will be described below with reference to FIG. 3.

Figure 3:
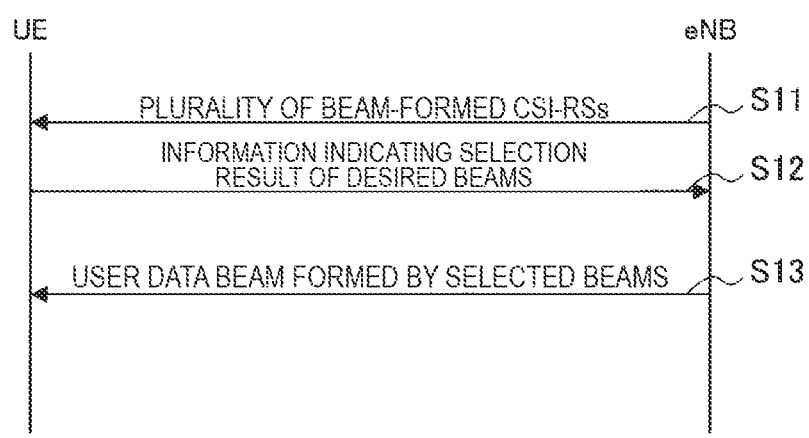
FIG. 3 is a sequence diagram illustrating an example of a flow of a beam tracking procedure based on a beam-formed CSI-RS.

FIG. 3 is a sequence diagram illustrating an example of a beam tracking procedure based on the beam-formed CSI-RS. As illustrated in FIG. 3, first, the eNB transmits a plurality of beam-formed CSI-RSs using a plurality of beams (step S11). Then, the UE selects desired beams among a plurality of beams used for the transmission of the beam-formed CSI-RS on the basis of a reception result of a plurality of provided beam-formed CSI-RSs and transmits information indicating a selection result to the eNB (step S12). The information indicating the selection result includes identification information of desired beams (typically, a beam number). For example, the UE selects one or more desired beams on the basis of the reception power of each beam. Then, the eNB provides user data beam-formed by the selected beams to the UE (step S13).

According to such a procedure, a tracking capability varies depending on a frequency at which a set of a plurality of beam-formed CSI-RSs is provided to the UE. For example, in a case in which a set of a plurality of beam-formed CSI-RSs is provided at intervals of 100 ms, the tracking is performed with a granularity of 100 ms. In a case in which the UE is moving at a speed at which it remains in the beams for 100 ms, the tracking with this granularity is good, but if the speed of the UE increases, for example a case in which tracking with a granularity of 5 ms or less is required occurs. In this case, the overhead of downlink resources for providing a set of a plurality of beam-formed CSI-RSs increases, and thus it is difficult to perform efficient communication.

(Beam Tracking Based on Uplink Reference Signal)

The eNB decides a plurality of beams used to transmit a plurality of beam-formed CSI-RSs described above on the basis of, typically, the uplink reference signal. The eNB detects a rough position of the UE on the basis of the uplink reference signal, selects a plurality of beam candidates suitable for the UE, and transmits a plurality of beam-formed CSI-RSs using a plurality of selected beam candidates. The uplink reference signal is also referred to as a sounding reference signal (SRS). A beam tracking procedure based on the SRS will be described below with reference to FIG. 4.

Figure 4:
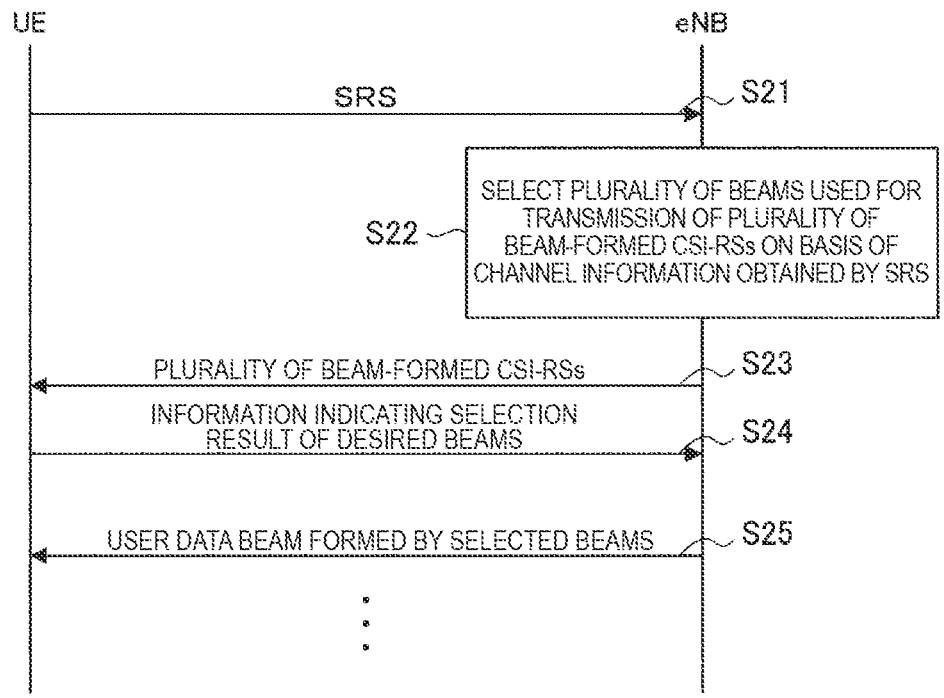
FIG. 4 is a sequence diagram illustrating an example of a flow of a beam tracking procedure based on an SRS.

FIG. 4 is a sequence diagram illustrating an example of a flow of the beam tracking procedure based on the SRS. As illustrated in FIG. 4, the UE first transmits the SRS to the eNB (step S21). Then, the eNB acquires channel information between the UE and the eNB on the basis of a reception result of the SRS, and selects a plurality of beams to be used for transmission of a plurality of beam-formed CSI-RSs on the basis of the channel information (step S22) Thereafter, in steps S23 to S25, a process similar to steps S11 to S13 described above with reference to FIG. 3 is performed.

Here, in the case of time division duplex (TDD), since radio resources are used by uplink and downlink which are switched alternately in terms of time, channel information is similar in downlink and uplink. On the other hand, in the case of frequency division duplex (FDD), since a frequency used for uplink differs from a frequency used for downlink, channel information differs between downlink and uplink. Therefore, in step S21, it can be said that the eNB can acquire (precisely, estimate) the downlink channel information on the basis of the SRS only in the case of TDD.

2.2. SRS

A main purpose of the SRS is for the eNB to acquire the uplink channel information at a frequency bandwidth (that is, bandwidth) to be operated and use the uplink channel information for downlink scheduling rather than the beam selection described above.

"Scheduling" refers to an operation of the eNB deciding part of downlink or uplink resources (unit resources divided by frequency and time) to be used and notifying the UE of the details of the decision. For example, in a case in which the bandwidth operated by the eNB is 20 MHz, a resource block includes 12 sub carriers arranged at intervals of 15 kHz. and IOU resource blocks are spread in 20 MHz. The resources of the 100 resource blocks are shared by a plurality of UEs. In other words, FDM is performed. Therefore, it can be said that an operation of deciding a part of 20 MHz to be used by the UE is the scheduling of the eNB.

The eNB achieves the main purpose described above on the basis of the SRS. Specifically, the eNB acquires the uplink channel information on the basis of the reception result of the SRS, estimates the downlink channel information on the basis of the acquired channel information, and performs the scheduling on the basis of the estimated downlink channel information.

The existing SRS designed for such a main purpose of scheduling is not considered to be suitable as a reference signal for beam selection. For example, channel information over the entire channel is not necessarily required for beam tracking.

(Format of SRS)

Figure 5:
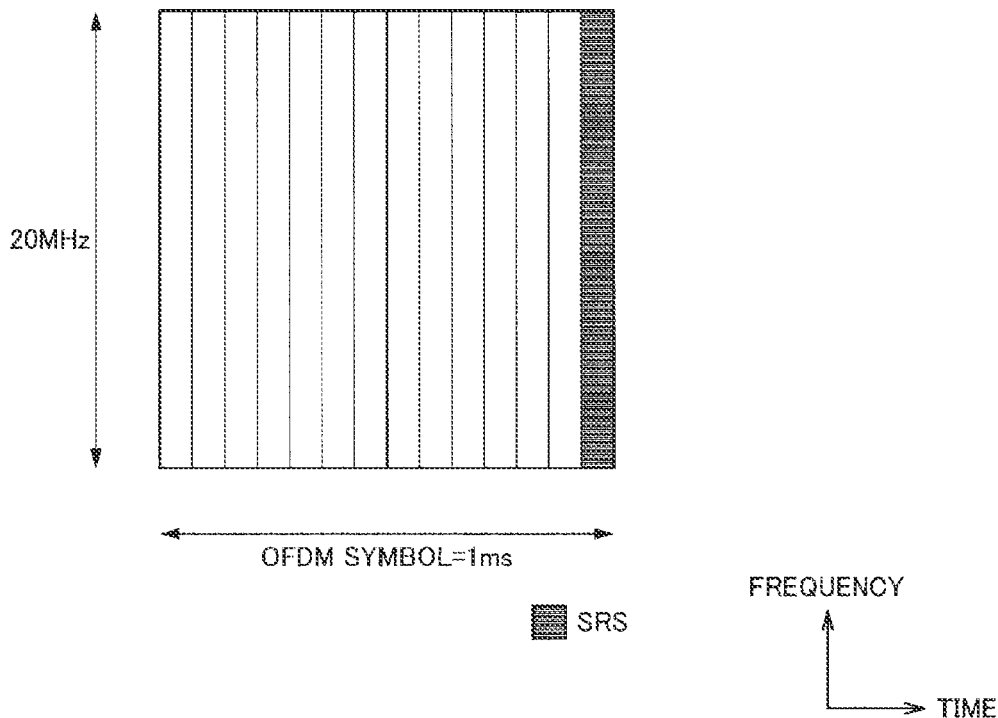
FIG. 5 is a diagram for describing an example of an SRS format in LTE.

FIG. 5 is a diagram for describing an example of a format of the SRS in LTE. The uplink of LTE is operated in accordance with single carrier frequency division multiple access (SC-FDMA), and includes 14 symbols per sub frame. A symbol in the time direction in the uplink is also referred to as an SC-FDMA symbol or an OFDM symbol. As illustrated in FIG. 5, the SRS is transmitted using the last OFDM symbol. Here, the SRS is not necessarily transmitted using the last OFDM symbol in all sub frames. For example, normally, a physical uplink shared channel (PUSCH) serving as user data and a physical uplink control channel (PUCCH) serving as a control signal are transmitted using all 14 OFDM symbols. Further, the SRS is transmitted using the last OFDM symbol only if necessary.

(Narrow Band SRS and Wide Band SRS)

There are cases in which the SRS occupies the entire operated bandwidth and is transmitted all at once as illustrated in FIG. 5. On the other hand, a part of the operated bandwidth may be used for single transmission of the SRS once. The former is also referred to as a wide band SRS, and the latter is also referred to as a narrow band SRS.

Figure 6:
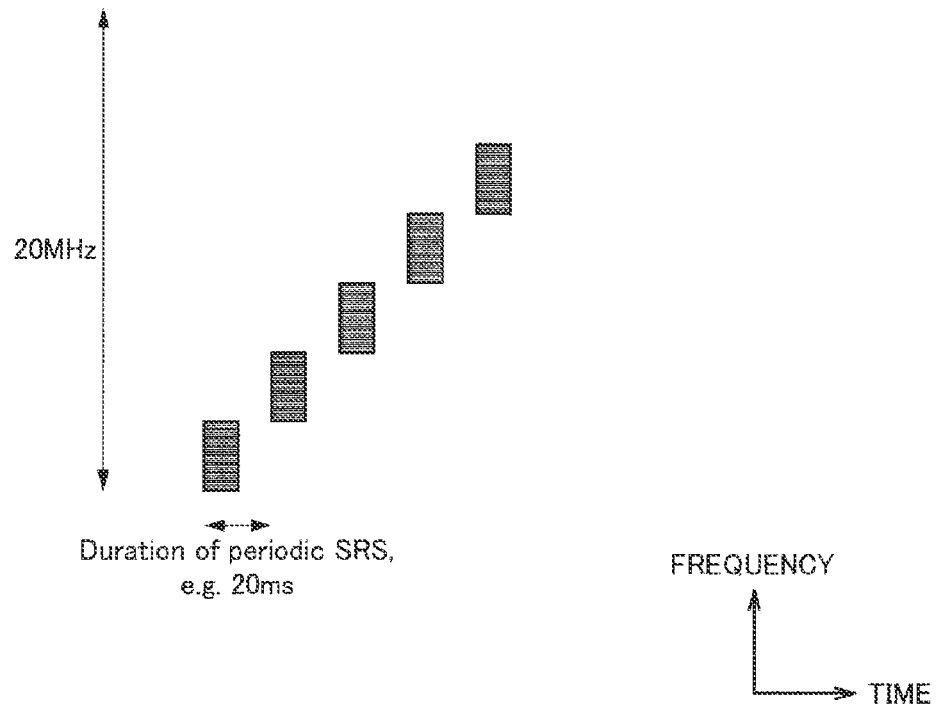
FIG. 6 is a diagram for describing an SRS of a narrow band in LTE.

FIG. 6 is a diagram for describing the narrow band SRS in LTE. As illustrated in FIG. 6, the narrow band SRS uses a part of the bandwidth in a single transmission. Here, in order to achieve the main purpose of detecting the channel state of the entire bandwidth to be operated, even m the narrow band SRS, the bandwidth used for transmission is shifted, and the SRS is transmitted over the entire operated bandwidth accordingly as illustrated in FIG. 6. A merit of the narrow band SRS lies m that it is possible to cause the uplink coverage of the SRS to be increased since the UE can use more power for a single transmission of the SRS. In other words, the merit of the narrow band SRS lies in that the quality of the SRS received by the eNB can be improved.

It should be noted here that both of the wide band SRS and the narrow band SRS are designed to be mainly intended to acquire the channel information of the entire operated bandwidth. In other words, a target bandwidth of both of the wide band SRS and the narrow band SRS is the entire bandwidth operated by the eNB.

(Periodic SRS and Aperiodic SRS)

The eNB can perform a setting in the UE so that the SRS is transmitted periodically or aperiodically.

In a case in which the periodic SRS is set, the eNB performs the setting using radio resource control (RRC) signaling in a semi-static manner. Thus, it is difficult to dynamically change, for example, the transmission period for the periodic transmission.

On the other band, m the case of the aperiodic SRS, the eNB transmits an SRS request aperiodically according to necessity, and the UE transmits the SRS in a case in which the SRS request is received. Here, the aperiodic SRS is not considered suitable as a reference signal for periodically selecting beams for beam tracking. This is because the downlink SRS request becomes overhead.

(Relation Between SRS and Beams Selection)

In a case m which the eNB provides beams to the UE, it is desirable to select beams suitable for the UE.

As a method for this purpose, it is considered that the eNB provides a plurality of beam-formed reference signals, and performs communication with the UE using the beams corresponding to the reception result in the UE as described above with reference to FIGS. 3 and 4. In this case, as described above with reference to FIG. 4, the eNB may decide a plurality of beams to be used for transmitting a plurality of beam-formed reference signals on the basis of the SRS. This is because the eNB can detect a direction of the UE roughly on the basis of the reception result of the SRS.

As described above, the SRS can be used for selecting the beams to be provided to the UE. On the other hand, since the SRS is the uplink reference signal, it is difficult for the eNB to detect a downlink interference situation on the basis of the reception result of the SRS. Therefore, it is desirable that the UE decide the final beams selection on the basis of the downlink reference signal.

(Conclusion)

The SRS has been described above. The following points have to be noted in a case in which the SRS is used for beam tracking.

A first point to be noted is that the existing SRS is mainly intended to acquire the channel information of the entire operated bandwidth. In the existing SRS, the overhead may occur in a case in which it is desired to detect only a direction of beams as in beam tracking, and uplink transmission efficiency may decrease in a case in which it is used for beam tracking.

A second point to be noted is that both the periodic SRS and the aperiodic SRS are not suitable for the purpose of beam tracking. For example, all UEs need not necessarily require very accurate tracking.

A third point to be noted is that it is difficult to detect a downlink interference situation in the SRS. It is desirable that the final beam selection be performed on the basis of the downlink reference signal.

2.3. Others

The difficulty of beam tracking will be discussed below.

First, it is assumed that the UE is stationary without moving at all. In this case, the beams selection for beam tracking is easy because there are many cases in which the beams suitable for the UE are not changed. Here, even in a case in which the UE is stationary, the beams selection may be performed again due to influence of beam blocking (hereinafter also referred to as blocking) occurring, for example, when a surrounding environment, for example, a shielding object such as a car or a person traverses between the eNB and the UE.

Further, a case in which the UE moves at a high speed is assumed. In this case, since it is necessary to cause beams to track the UE moving at the high speed, the difficulty of beam tracking is high. In a case in which the beams provided to the UE are sharp, the difficulty level of beam tracking is higher. For example, in a case in which beams of a 1° width are provided, the difficulty level is higher than that, for example, in a case in which beams of a 10° width are provided. As the beams are sharper, a period of time for the UE to move within a range included in beams is reduced.

In a case in which a discontinuous change in a channel environment occurs irrespective of the moving speed of the UE, the difficulty level of the beam selection is high. The discontinuous change in the channel environment occurs, for example, in a case in which a shielding object suddenly enters between the eNB and the UE, in a case in which the UE with the antennas placed in a plane manner is suddenly rotated, or the like. In this case, the beams suitable for the UE may change. Further, it is considered that there are cases in which beams reaching the UE indirectly are more suitable than beams reaching the UE directly.

3. Configuration Example of Each Apparatus

Next, an example of a configuration of each apparatus included in a system 1 according to one embodiment of the present disclosure will be described.

3.1. Configuration Example of Base Station

Figure 7:
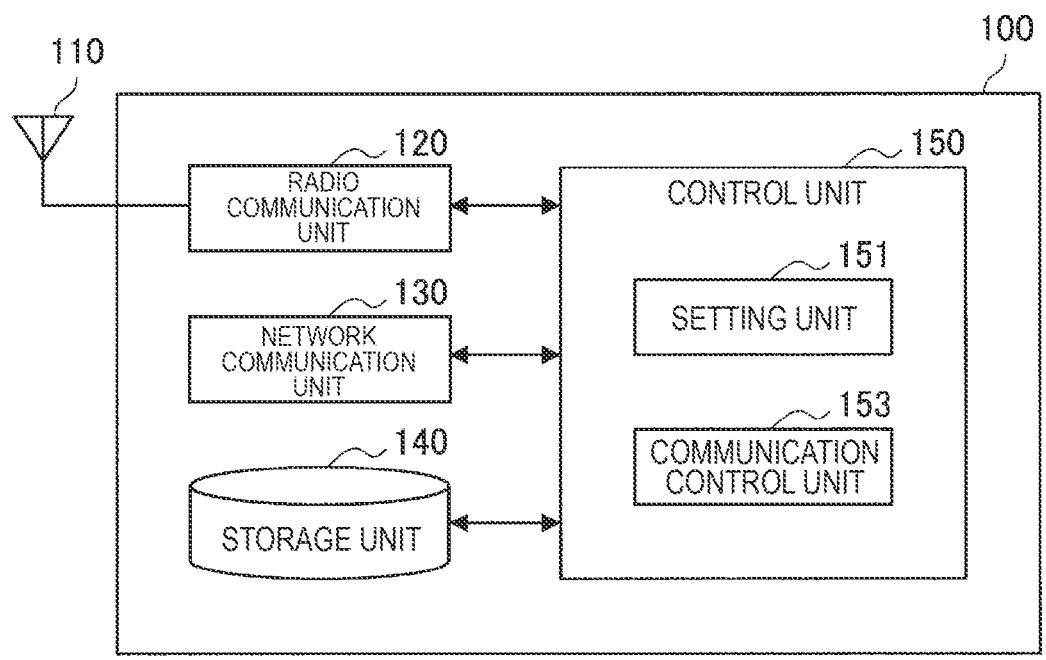
FIG. 7 is a block diagram illustrating an example of a configuration of a base station according to a first embodiment.

FIG. 7 is a block diagram illustrating an example of a configuration of the macro cell base station 100 according to the present embodiment. As illustrated in FIG. 7, the macro cell base station 100 includes an antenna unit 110, the radio communication unit 120, a network communication unit 130, a storage unit 140 and a control unit 150.

(1) Antenna Unit 110

The antenna unit 110 emits a signal to be output by the radio communication unit 120 into space as radio waves. In addition, the antenna unit 110 converts spatial radio waves into a signal and outputs the signal to the radio communication unit 120.

In particular, in the present embodiment, the antenna unit 110 includes a plurality of antenna elements and is capable of performing beam forming.

(2) Radio Communication Unit 120

The radio communication unit 120 transmits and receives signals. For example, the radio communication unit 120 transmits a downlink signal to the terminal apparatus and receives an uplink signal from the terminal apparatus.

In particular, in the present embodiment, the radio communication unit 120 can form a plurality of beams through the antenna unit 110 and communicate with the terminal apparatus 200.

(3) Network Communication Unit 130

The network communication unit 130 transmits and receives information. For example, the network communication unit 130 transmits information to another node and receives information from the other node. For example, the other node includes another base station and a core network node.

(4) Storage Unit 140

The storage unit 140 temporarily or permanently stores a program and various data for an operation of the base station 100.

(5) Control Unit 150

The control unit 150 provides various functions of the base station 100. The control unit 150 includes a setting unit 151 and a communication control unit 153. Further, the control unit 150 may further include other components than these components. In other words, the control unit 150 may also perform operations other than those of these components. The operations of the setting unit 151 and the communication control unit 153 will be described later in detail.

3.2. Configuration of Terminal Apparatus

Figure 8:
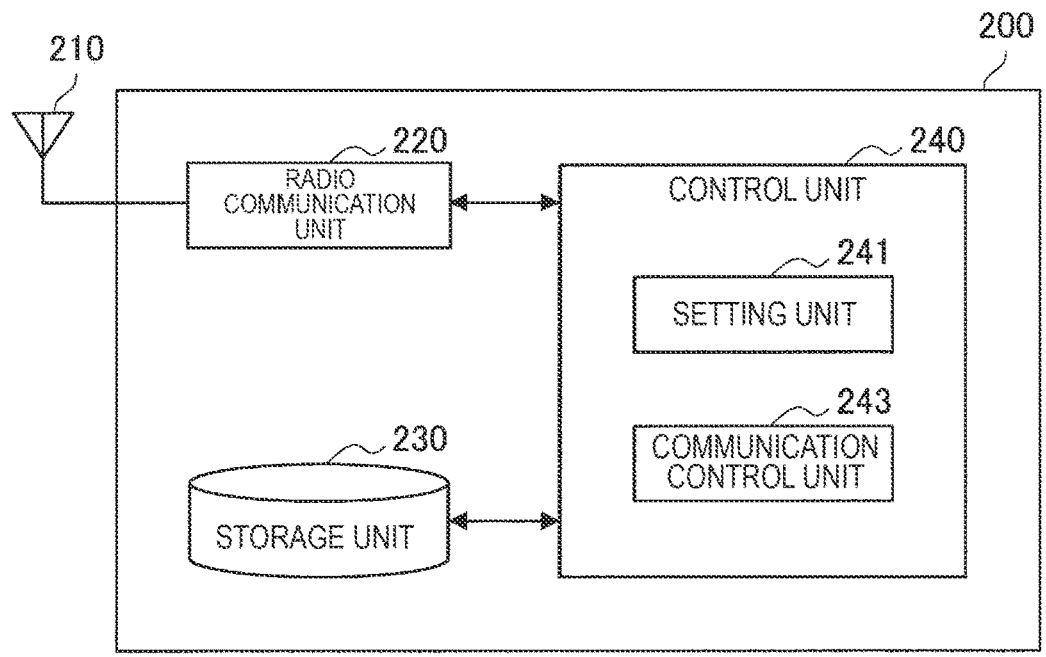
FIG. 8 is a block diagram illustrating an example of a configuration of a terminal apparatus according to the present embodiment.

FIG. 8 is a block diagram illustrating an example of a configuration of the terminal apparatus 200 according to the present embodiment. As illustrated in FIG. 8, the terminal apparatus 200 includes an antenna unit 210, a radio communication unit 220, a storage unit 230 and a control unit 240.

(1) Antenna Unit 210

The antenna unit 210 emits a signal to be output by the radio communication unit 220 into space as radio waves. In addition, the antenna unit 210 converts spatial radio waves into a signal and outputs the signal to the radio communication unit 220.

(2) Radio Communication Unit 220

The radio communication unit 220 transmits and receives signals. For example, the radio communication unit 220 receives a downlink signal from the base station and transmits an uplink signal to the base station.

In particular, in the present embodiment, the radio communication unit 220 can communicate with the base station 100 that forms a plurality of beams and perform communication.

(3) Storage Unit 230

The storage unit 230 temporarily or permanently stores a program and various data for an operation of the terminal apparatus 200.

(4) Control Unit 240

The control unit 240 provides various functions of the terminal apparatus 200. The control unit 240 includes a setting unit 241 and a communication control unit 243. Further, the control unit 240 may further include other components than these components. In other words, the control unit 240 may also perform operations other than the operations of these components. The operations of the setting unit 241 and the communication control unit 243 will be described later in detail.

Hereinafter, the base station 100 is also referred to as an eNB 100, and the terminal apparatus 200 is also referred to as a UE 200.

4. First Embodiment

The first embodiment is a basic embodiment in which the UE 200 transmits an uplink reference signal for the beam selection.

4.1. Technical Problems

As described above, in the case of the wide band and in the case of the narrow band, the SRS is mainly intended to acquire the channel information of the entire bandwidth operated by the eNB. Further, there is no uplink reference signal designed for beam tracking. In this regard, in the present embodiment, an uplink reference signal for enabling efficient beam tracking (that is, UE tracking (beams selection for the UE)) is provided.

4.2. Technical Features

Technical features of the present embodiment will be described below.

(1) SRS for Beams Selection

Type B SRS

The UE 200 (for example, the communication control unit 243) transmits a first uplink reference signal and a second uplink reference signal which has a narrower target bandwidth and a shorter transmission period than the first uplink reference signal. By using the first uplink reference signal and the second uplink reference signal together, the eNB 100 can perform efficient beam tracking while performing scheduling.

The first uplink reference signal is an uplink reference signal which is mainly intended to acquire the channel information of the entire bandwidth operated by the eNB 100. In other words, the first uplink reference signal uses the entire bandwidth in which communication with the eNB 100 can be performed, that is, the bandwidth operated by the eNB 101) as the target bandwidth. For example, the first uplink reference signal may be the wide band SRS or the narrow band SRS described above. Hereinafter, the first uplink reference signal is also referred to as a type A SRS.

The second uplink reference signal is an uplink reference signal which is mainly intended is to enable efficient beam tracking used for beam tracking by the eNB 100. Hereinafter, the second uplink reference signal is also referred to as a type B SRS. Hereinafter, the type B SRS will be described with reference to FIG. 9.

Figure 9:
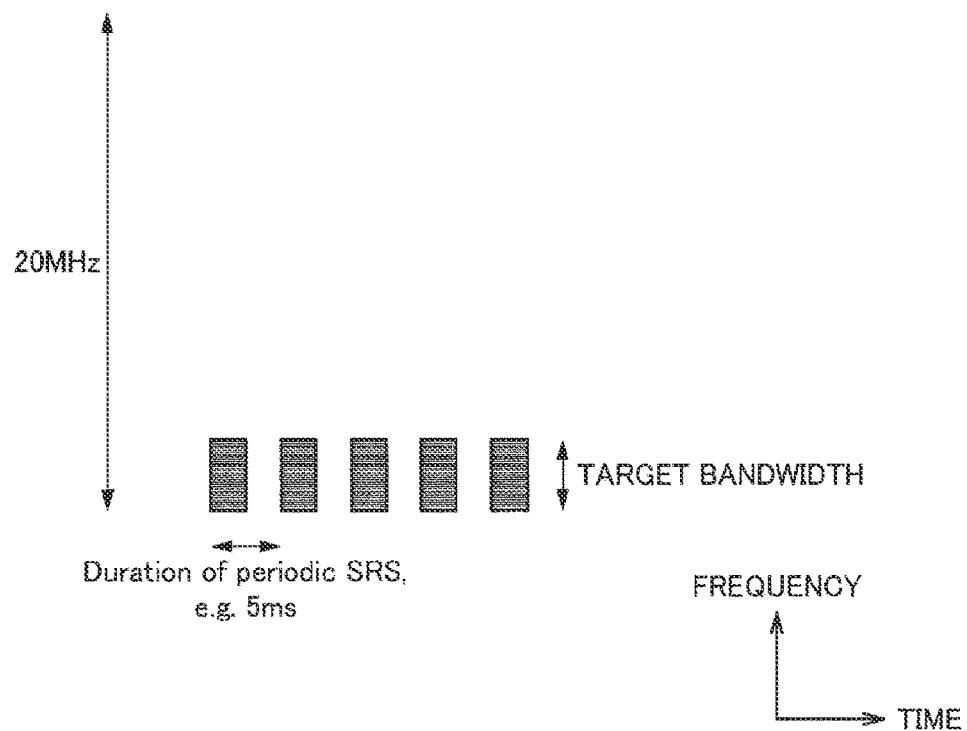
FIG. 9 is a diagram for describing an example of a type B SRS according to the present embodiment.

FIG. 9 is a diagram for describing an example of the type B SRS according to the present embodiment. As illustrated in FIG. 9, in a case in which the bandwidth operated by eNB is 20 MHz, for example, the SRS of type B is to transmitted at a transmission period of 5 ms (millisecond using a part of the bandwidth (for example, 1 MHz) as a target bandwidth. Further, the type A SRS is not illustrated in FIG. 9.

As illustrated in FIG. 9, the type B SRS has a narrower target bandwidth than the type A SRS. Regardless of whether it is the wide band or the narrow band, the target bandwidth of the type A SRS is the entire bandwidth operated by the eNB. On the other hand, the target band of the type B SRS is a part of the bandwidth operated by the eNB. In other words, the type B SRS uses, as the target bandwidth, a part of the bandwidth in which communication with the eNB 100 can be performed, that is, the entire bandwidth operated by the eNB 100. Since the type B SRS has narrower target bandwidth than the type A SRS, it is possible to narrow the bandwidth and efficiently transmit SRS for beam tracking.

Further, as illustrated in FIG. 9, a plurality of type B SRSs may be periodically transmitted at the same frequency position. Further, the frequency position refers to a position in a frequency domain. Accordingly, the eNB 100 can detect a change in the channel information at the same frequency position and perform beam tracking appropriately.

Further, the type B SRS has a shorter transmission period than the type A SRS. In other words, the type B SRS is transmitted with a higher frequency than the type A SRS. For example, it is desirable that the type B SRS be transmitted at intervals of 5 milliseconds to 10 milliseconds. In particular, in a case m which the interval is 5 milliseconds, the UE 200 moving at, for example, 500 km/h can communicate with the eNB 100 which forms beams whose half-value width is 1° or less and is at a distance of 20 m. With such a short transmission period, the eNB 100 can perform beam tracking even in a case in which the UE 200 moves at a high speed.

The transmission period of the type B SRS for enabling beam tracking even in a case in which the UE moves at a high speed will be described below with reference to Tables 1 to 3. Tables 1 to 3 show a radius of a beam transmitted from a transmission/reception point (TRP) to a UE (a radius of a region which one beam reaches) and a time for the UE located at a center of a region which beams reach to go out of the region for each distance between the TRP and the UE. Table 1 shows a case in which the UE is moving at 30 km/h, Table 2 shows a case in which the UE is moving at 120 km/h, and Table 3 shows a case in which the UE is moving at 250 km/h (for example, vehicle to everything (V2X) in a freeway). A time which is equal to or less than the time for the UE located at the center of the region in which beams reach to go out of the region in Tables 1 to 3 can be permitted as a beam selection interval. In other words, it is desirable that a time equal to or shorter than the time for the UE located at the center of the region in which beams reach to go out of the region in Tables 1 to 3 be employed as the transmission interval of the type B SRS. In this regard, as illustrated in the following Tables 1 to 3, this condition is satisfied in every assumed case in a case in which the transmission period is 5 msec, and this condition is satisfied in most cases in a case in which the transmission period is 10 msec.

TABLE 1

| Distance between UE and TRP [m] | Radius of a Beam [m] | Time to go out from a beam center [ms] |
|---|---|---|
| 20 | 0.17 | 20.9 |
| 40 | 0.34 | 41.8 |
| 80 | 0.69 | 83.7 |
| 100 | 0.87 | 104.6 |
| 120 | 1.04 | 125.6 |

TABLE 2

| Distance between UE and TRP [m] | A Beam Radius around UE [m] | Time to go out from a beam center [ms] |
|---|---|---|
| 20 | 0.17 | 5.2 |
| 40 | 0.34 | 10.4 |
| 80 | 0.69 | 20.9 |
| 100 | 0.87 | 26.1 |
| 120 | 1.04 | 31.4 |

TABLE 3

| Distance between UE and TRP [m] | A Beam Radius around UE [m] | Time to go out from a beam center [ms] |
|---|---|---|
| 50 | 0.17 | 6.2 |
| 100 | 0.34 | 12.5 |
| 150 | 0.69 | 18.8 |
| 200 | 0.87 | 25.1 |
| 250 | 1.04 | 31.4 |

Operation Based on Type B SRS

The eNB 100 (for example, the communication control unit 153) performs reception of the type A SRS and the type B SRS which has a narrower target bandwidth and a shorter transmission period than the type A SRS from the UE 200.

The eNB 100 acquires the channel information of the entire operated bandwidth on the basis of the reception result of the type A SRS and performs scheduling. Further, the eNB 110 selects beams suitable for the UE 200 on the basis of the reception result of the type B SRS.

Setting for Type B SRS

The eNB 100 (for example, the setting unit 151) transmits setting information for the type B SRS (corresponding to first setting information) to the UE 200. Then, the UE 200 (for example, the setting unit 241) performs a transmission setting for the type B SRS on the basis of the setting information received from the eNB 100. The setting information may include information indicating, for example, the transmission period and a frequency position and width of the target bandwidth. Accordingly, the UE 200 can transmit the type B SRS with the transmission period and the bandwidth indicated from eNB 100.

Flow of Process

An example of a flow of an SRS transmission/reception process according to the present embodiment will be described below with reference to FIG. 10. The SRS transmission/reception process can be executed in step S21 if it is assumed that the beam tracking procedure based on the SRS described above with reference to FIG. 4 is also performed in NR. In other words, the SRS transmission/reception process to be described below can be included in the beam tracking procedure.

Figure 10:
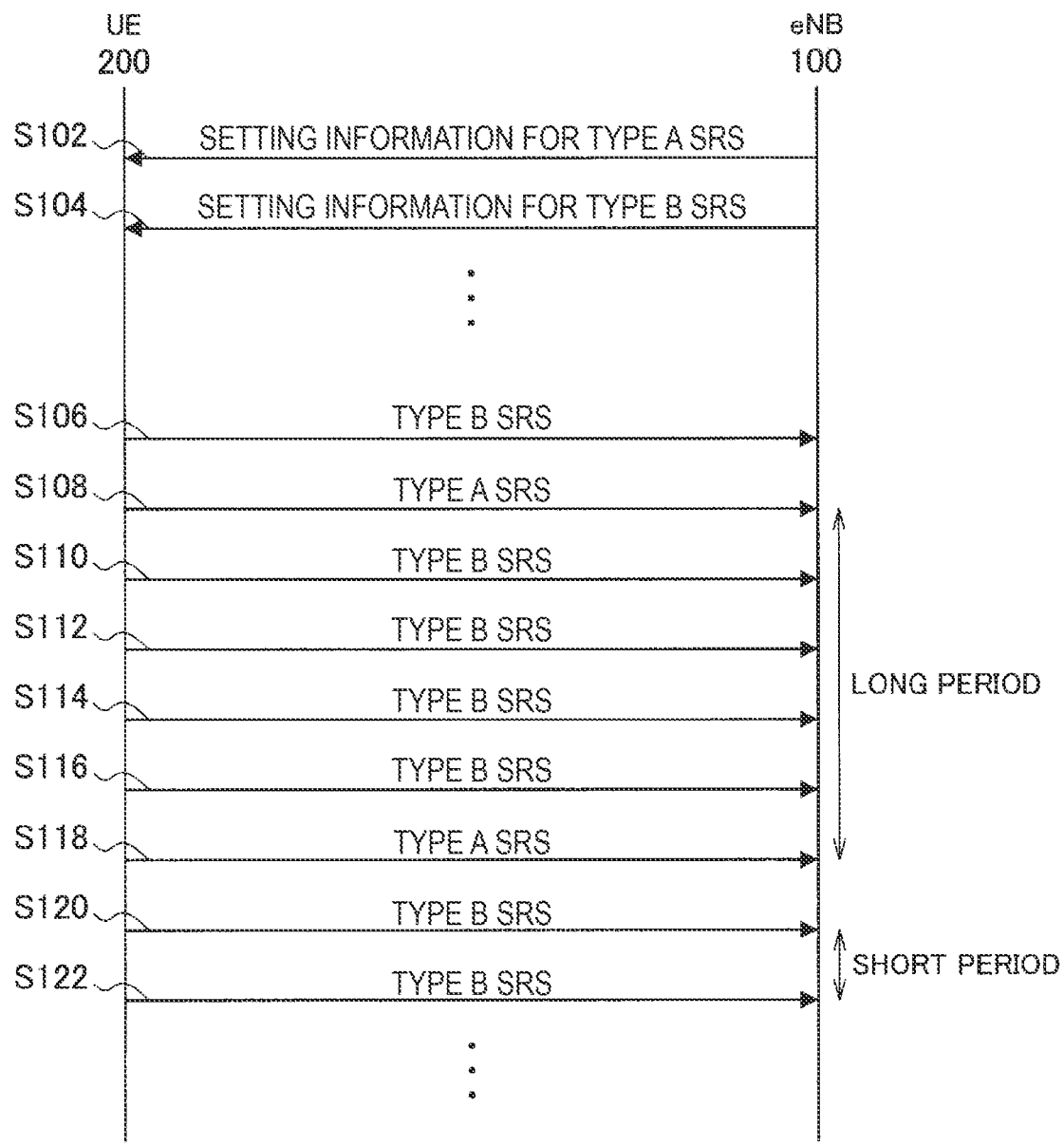
FIG. 10 is a sequence diagram illustrating an example of a flow of an SRS transmission/reception process executed in a system according to the present embodiment.

FIG. 10 is a sequence diagram illustrating an example of the flow of the SRS transmission/reception process executed in the system 1 according to the present embodiment. As illustrated in FIG. 10, the eNB 100 and the UE 200 are involved in the present sequence.

First, the eNB 100 transmits the setting information for the type A SRS to the UE 200 (step S102). The setting information includes information indicating, for example, the transmission period. Then, the eNB 100 transmits the setting information for the type B SRS to the UE 200 (S104). The setting information includes, for example, information indicating the transmission period and the frequency position and the width of the target bandwidth.

Thereafter, the eNB 100 transmits the type A SRS at a long transmission period and transmits the type B SRS at a short transmission period. For example, after the type B SRS is transmitted (step S106), the eNB 100 transmits the type A SRS (step S108), and then transmits the type B SRS at a short transmission period (steps S110 to S116). Thereafter, similarly, the eNB 100 transmits the type A SRS (step S118) and transmits the type B SRS at a short transmission period (steps S120 and S122 and omitted afterwards). As illustrated in FIG. 10, the transmission period of the type A SRS is long, and the transmission period of the type B SRS is short.

(2) Dynamic Setting

The eNB 100 (for example, the setting unit 151) may dynamically perform the transmission setting of the type B SRS. The dynamic transmission setting of the type B SRS will be described below with reference to FIG. 11.

Figure 11:
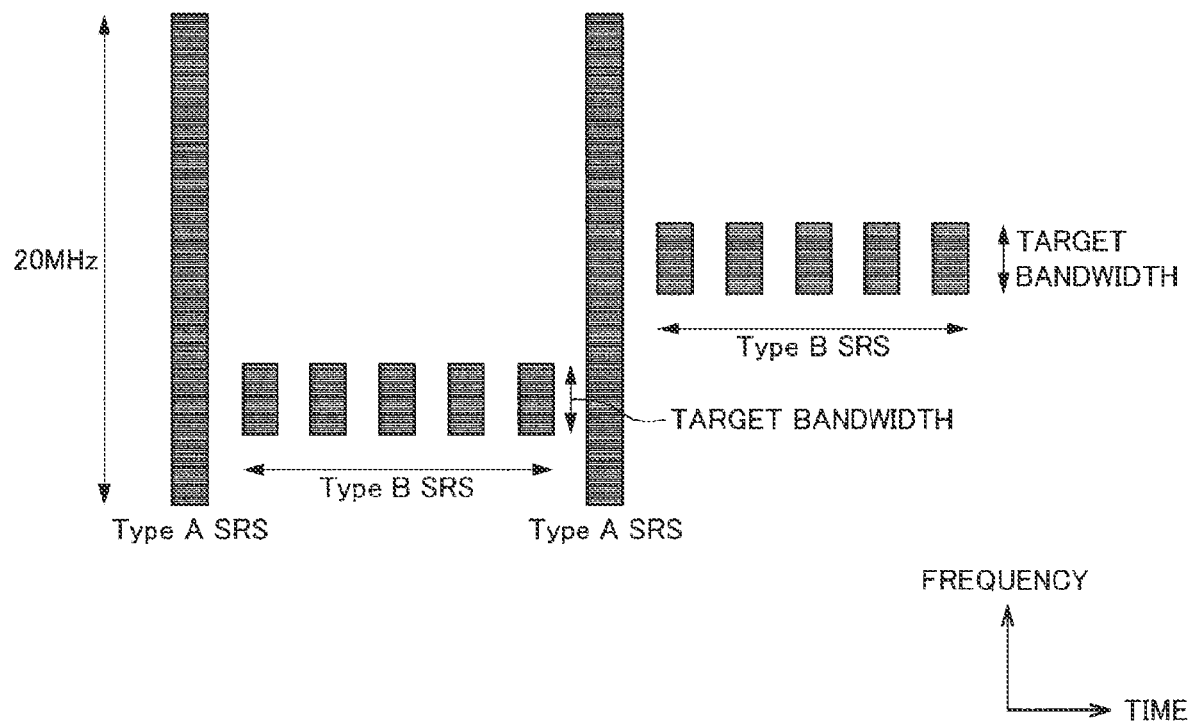
FIG. 11 is a diagram for describing an example of a dynamic transmission setting of a type B SRS according to the present embodiment.

FIG. 11 is a diagram for describing an example of the dynamic transmission setting of the type B SRS according to the present embodiment. In the example illustrated in FIG. 11, the frequency position of the bandwidth in which the type B SRS is transmitted dynamically changes each time the type A SRS is transmitted.

For example, the eNB 100 (for example, the setting unit 151) may perform the transmission setting of the type B SRS on the basis of the reception result of the type A SRS. Then, the eNB 100 may transmit the setting information (corresponding to the first setting information) corresponding to the reception result of the type A SRS to the UE 200. For example, the eNB 100 sets the frequency position of the target bandwidth of the type B SRS on the basis of the reception result of the type A SRS. Specifically, the eNB 100 sets the target bandwidth of the type B SRS at a frequency position having a good channel quality (for example, a signal noise interference ratio (SINR)) on the basis of the channel information of the entire operated bandwidth which is acquired on the basis of the reception result of the type A SRS. In other words, the target bandwidth of the type B SRS may be a bandwidth at a frequency position having a good channel quality based on the reception result of the type A SRS. The setting information may include information indicating the width of the target bandwidth, the transmission period, and the like in addition to the frequency position of the target bandwidth. Accordingly, the UE 200 can transmit the type B SRS using the bandwidth at the frequency position having the good channel frequency as the target bandwidth. On the other hand, if the type B SRS is transmitted at a bandwidth at a channel position having a poor channel quality, the eNB 100 is likely to keep having a tracking failure. If the eNB 100 fails to receive the type B SRS even once, beam tracking in the eNB 100 becomes difficult.

A frequency position having a good channel quality and a frequency position having a bad channel quality may be mixed in the entire operated bandwidth. A method of performing frequency hopping on the type B SRS as in the narrow band SRS described above can be also considered, but the SRS is likely to be transmitted at a bandwidth having an inappropriate frequency position due to influence of fading or the like. In this regard, the eNB 100 acquires the channel information of the entire bandwidth operated by the type A SRS if necessary and thus can dynamically and appropriately set the frequency position of the bandwidth serving as the target bandwidth of the type B SRS.

Here, in a case in which the transmission setting is performed each time the type B SRS is transmitted the downlink overhead is increased due to the transmission of the setting information from the eNB 100. In this regard, the eNB 100 may periodically perform the transmission setting as illustrated in FIG. 11. In the example illustrated in FIG. 1, the eNB 100 performs the transmission setting each time the type A SRS is received, but the eNB 100 may perform the transmission setting after the type A SRS is received twice or more or may perform the transmission setting only in a case m which the setting is changed.

Further, FIG. 11 illustrates an example in which the target bandwidth is consecutive (that is, a series of consecutive bandwidths), and hopping is performed in them, but the present technology is not limited to this example. For example, the target bandwidth may be a plurality of discrete bandwidths, and hopping may be performed over a plurality of discrete bandwidths.

Of course, the eNB 100 can perform the transmission setting of the type B without using the reception result of the type A SRS, but if the reception result of the type A SRS is used, the eNB 100 can perform a more appropriate transmission setting.

Flow of Process

An example of the flow of the SRS transmission/reception process according to the present embodiment will be described below with reference to FIG. 12. The SRS transmission/reception process to be described below can be included in the beam tracking procedure.

Figure 12:
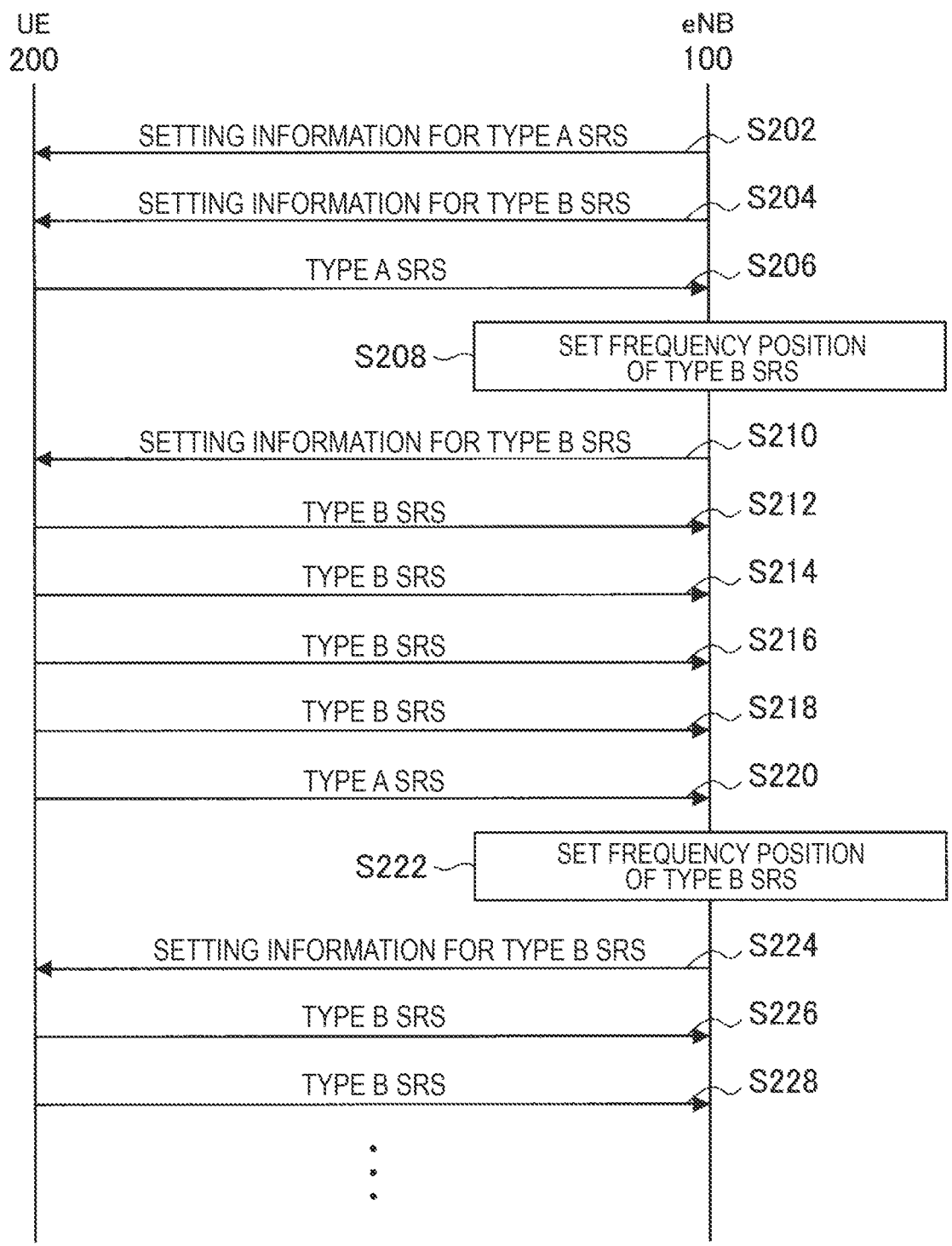
FIG. 12 is a sequence diagram illustrating an example of a flow of an SRS transmission/reception process executed in a system according to the present embodiment.

FIG. 12 is a sequence diagram illustrating an example of the flow of the SRS transmission/reception process executed in the system 1 according to the present embodiment. As illustrated in FIG. 12, the eNB 100 and the UE 200 are involved in the present sequence.

First, the eNB 100 transmits the setting information for the type A SRS to the UE 200 (step S202). The setting information includes information indicating, for example, the transmission period. Then, the eNB 100 transmits the setting information for the type B SRS to the UE 200 (S204). The setting information includes, for example, information indicating the transmission period and the frequency position and the width of the target bandwidth.

Then, the UE 200 transmits the type B SRS (step S206). Then, the eNB 100 sets the frequency position of the type B SRS on the basis of the reception result of the type A SRS (step S208), and transmits the setting information for the type B SRS in which this setting is reflected to the UE 200 (Step S210). Thereafter, the UE 200 transmits the type B SRS at a short transmission period (steps S212 to S218). Thereafter, the process of steps S206 to S218 is repeated (steps S220 to S228 and omitted afterwards).

(3) Frequency Hopping

The UE 200 (for example, the communication control unit 243) may transmit the type B SRS while causing the frequency hopping to be performed in the target bandwidth. As the frequency hopping is performed, it is possible to reduce influence of noise or the like. The frequency hopping of the type B SRS will be described below with reference to FIG. 13.

Figure 13:
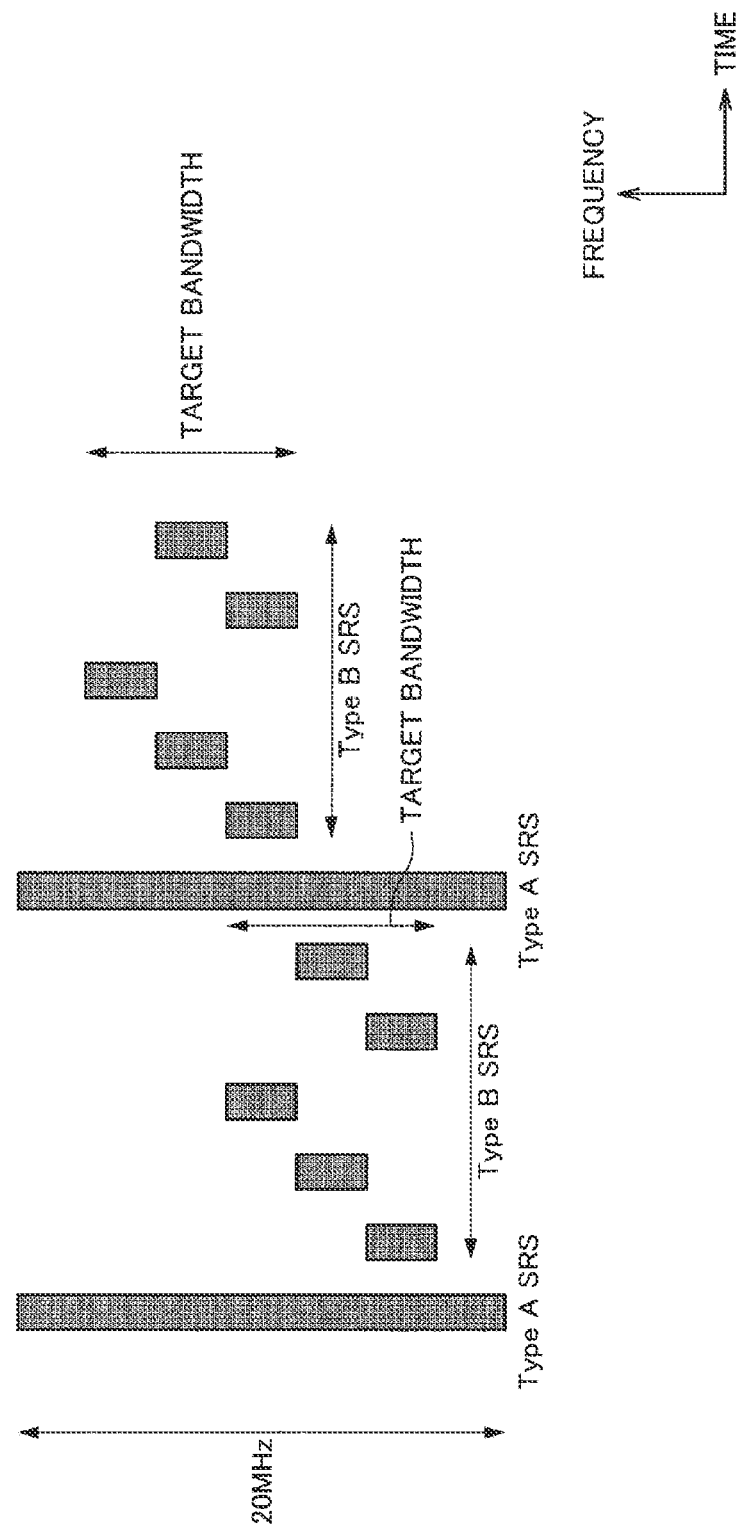
FIG. 13 is a diagram for describing frequency hopping of a type B SRS according to the present embodiment.

FIG. 13 is a diagram for describing the frequency hopping of the type B SRS according to the present embodiment. In the example illustrated in FIG. 13, the UE 200 transmits the type B SRS while causing the frequency hopping to be performed in the target bandwidth. As described above with reference to FIG. 11, the eNB 100 can set the target bandwidth on the basis of the reception result of the type A SRS. Therefore, as illustrated in FIG. 13, the frequency position of the target bandwidth can change dynamically each time the type A SRS is transmitted.

As described above, in a case in which the eNB 100 fails to receive the type B SRS even once, beam tracking in the eNB 100 becomes difficult. In this regard, the frequency hopping is further performed in the target bandwidth while using the bandwidth at the frequency position having the good channel quality as the target bandwidth, and thus the tracking failure probability can be further reduced.

Setting for Type B SRS

The setting information (corresponding to the first setting information) transmitted from the eNB 100 may include setting information related to the frequency hopping of the type B SRS. The setting information related to the frequency hopping includes, for example, information indicating a frequency hopping pattern. Accordingly, the UE 200 can transmit the type B SRS using the frequency hopping pattern indicated from the eNB 100.

(4) Setting Based on Downlink Reference Signal

The UE 200 (for example, the setting unit 241) may performs the transmission setting for the type B SRS on the basis of the downlink reference signal received from eNB 100. For example, the UE 200 sets the frequency position and the width of the target bandwidth, sets the transmission period, or sets the frequency hopping pattern on the basis of the downlink reference signal. Accordingly, since the setting information need not be transmitted to the UE 200 each time the setting is changed, the eNB 100 can reduce the processing load of the eNB 100 and reduce the downlink overhead.

Further, even the transmission of the type A SRS can be omitted, and in this case, the uplink overhead can be reduced as well.

The downlink reference signal may be, for example, the CSI-RS. For example, the eNB 100 can transmit the CSI-RS at the entire operated bandwidth.

The UE 200 (for example, the setting unit 241) may transmit the setting information (corresponding to the second setting information) indicating the transmission setting for the type B SRS performed on the basis of the downlink reference signal to the eNB 100. Then, the eNB 100 (for example, the setting unit 151) performs a reception setting for the type B SRS on the basis of the setting information received from the UE 200. This setting information is also regarded as the setting information related to the frequency hopping. The setting information may include information indicating, for example, the transmission period, the frequency position and the width of the target bandwidth, and the like in addition to the frequency hopping pattern.

Flow of Process

An example of the flow of the SRS transmission/reception process according to the present embodiment will be described below with reference to FIGS. 14 and 15. The SRS transmission/reception process to be described below can be included in the beam tracking procedure.

Figure 14:
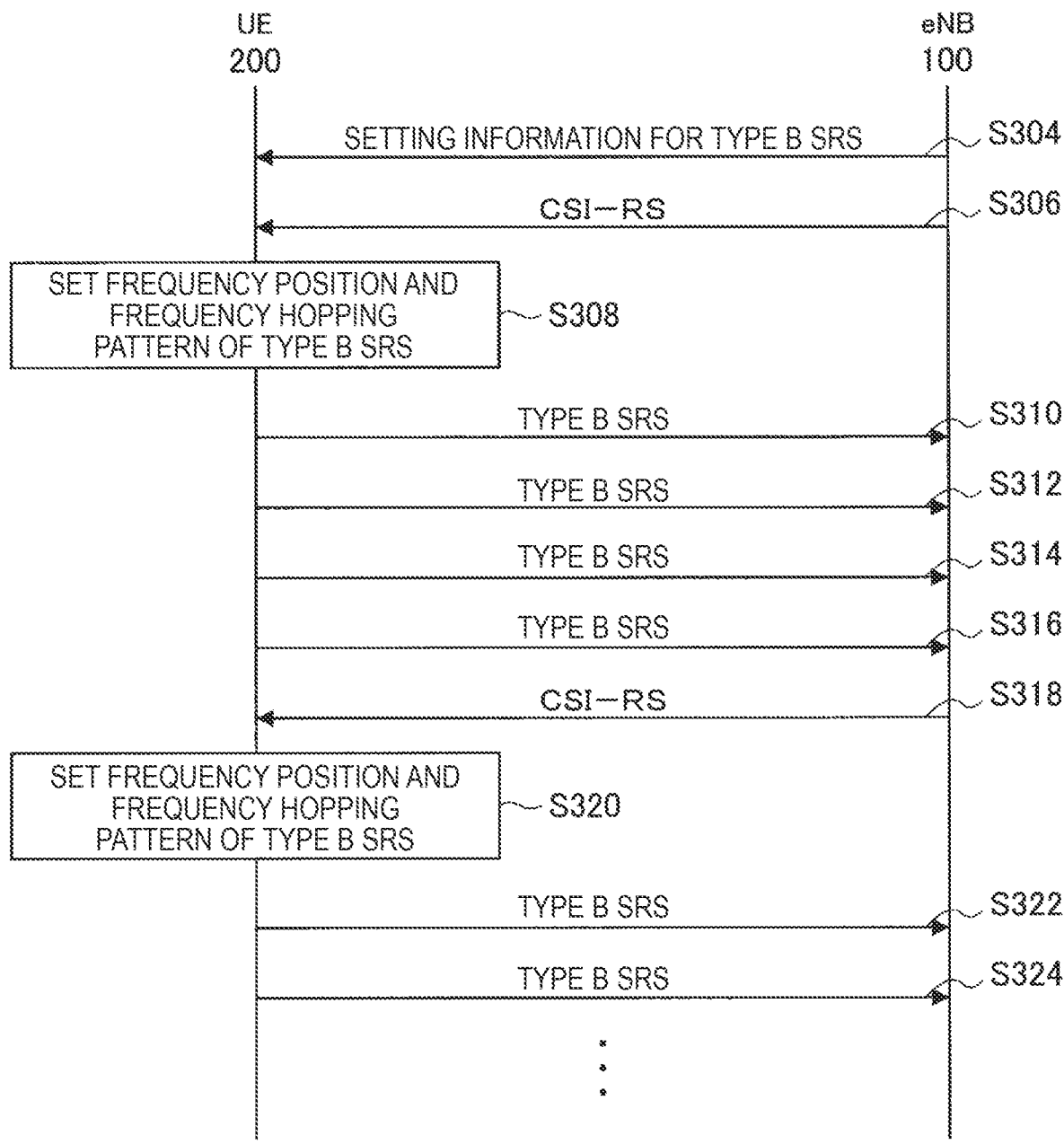
FIG. 14 is a sequence diagram illustrating an example of a flow of an SRS transmission/reception process executed in a system according to the present embodiment.

FIG. 14 is a sequence diagram illustrating an example of the flow of the SRS transmission/reception process executed in the system 1 according to the present embodiment. As illustrated in FIG. 14, the eNB 100 and the UE 200 are involved in the present sequence. The present sequence indicates a case in which the second setting information is not transmitted.

First, the eNB 100 transmits the setting information for the type B SRS to the UE 200 (step S304). The setting information includes, for example, information indicating the transmission period and the frequency position and the width of the target bandwidth.

Then, the eNB 100 transmits the CSI-RS to the UE 200 (step S306). Then, the UE 200 sets the frequency position and the frequency hopping pattern of the type B SRS on the basis of the reception result of the CSI-RS (step S308). Thereafter, the eNB 100 transmits the type B SRS at a short transmission period on the basis of the setting (steps S310 to S316). Thereafter, the process of steps S306 to S316 is repeated (steps S318 to S324 and omitted afterwards).

Figure 15:
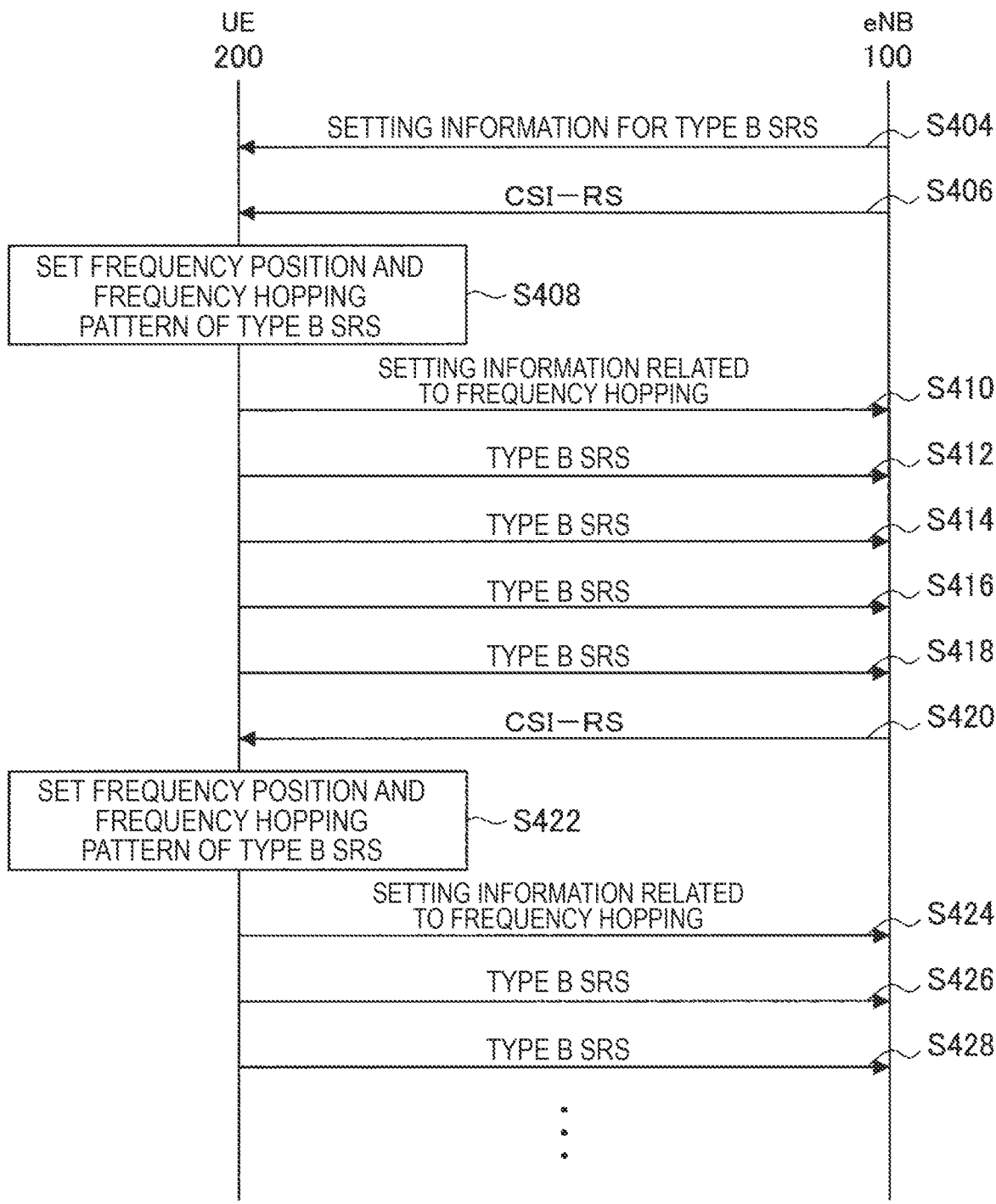
FIG. 15 is a sequence diagram illustrating an example of a flow of an SRS transmission/reception process executed in a system according to the present embodiment.

FIG. 15 is a sequence diagram illustrating an example of the flow of the SRS transmission/reception process executed in the system 1 according to the present embodiment. As illustrated in FIG. 15, the eNB 100 and the UE 200 are involved m the present sequence. The present sequence indicates a case in which the second setting information is transmitted.

First, the eNB 100 transmits the setting information for the type B SRS to the UE 200 (step S404). The setting information includes, for example, information indicating the transmission period and the frequency position and the width of the target bandwidth.

Then, the eNB 100 transmits the CSI-RS to the UE 200 (step S406). Then, the UE 200 sets the frequency position and the frequency hopping pattern of the type B SRS on the basis of the reception result of the CSI-RS (step S408), and transmits the setting information related to the frequency hopping in which the setting is reflected to the eNB 100 (step S410). Thereafter, the UE 200 transmits the type B SRS at a short transmission period (steps S412 to S418). Thereafter, the process of steps S406 to S418 is repeated (steps S420 to S428 and omitted afterwards).

(5) Supplement

In the above example, it is assumed that the type A SRS is a periodic SRS, but the type A SRS may be an aperiodic SRS. Here, in the case of the aperiodic SRS, a transmission period equal to or longer than that of the periodic SRS is assumed to be set. This is because it is not assumed that the transmission period of the type A SRS is shorter than that of the type B SRS because it is mainly intended to acquire the channel information of the entire operated bandwidth. Further, in the above example, the type A SRS is illustrated as the wide band SRS and described, but the type A SRS may be the narrow band SRS.

5. Second Embodiment

A second embodiment is a mode in which the UE 200 transmits a plurality of type B SRSs which have undergone the frequency hopping using a plurality of types of frequency hopping patterns.

5.1. Technical Problems

As described above, if the eNB 100 fails to receive the type B SRS even once, beam tracking in the eNB 100 becomes difficult. Therefore, it is important that the eNB 100 receives the type B SRS correctly each time. Here, the same uplink resources can be used between adjacent eNBs 100. In this case, the type B SRS transmitted from the UE 200 connected to a certain cell may collide with the type B SRS transmitted from the UE 200 connected to thane adjacent cell. In a case in which the collision occurs, the eNB 100 fails to receive the type B SRS, and thus beam tracking fails.

Here, in a case in which the frequency hopping is applied to the type B SRS, if the frequency hopping pattern differs between UEs connected to adjacent cells, the probability of collision is considered to be reduced. However, in a case in which hopping periods are different although the frequency hopping patterns are different, there is still a possibility of collision.

5.2. Technical Features

The UE 200 (for example, the communication control unit 243) may multiplex each of a plurality of type B SRSs using different frequency hopping patterns. Accordingly, even although the collision occurs in some frequency hopping patterns, the failure of beam tracking can be avoided unless the collisions occur in some other frequency hopping patterns. In other words, since a plurality of type B SRSs are multiplexed using different frequency hopping patterns, it is possible to reduce the probability of the failure of beam tracking. The multiplexing of the type B SRSs using the different frequency hopping patterns will be described blow with reference to FIG. 16.

Figure 16:
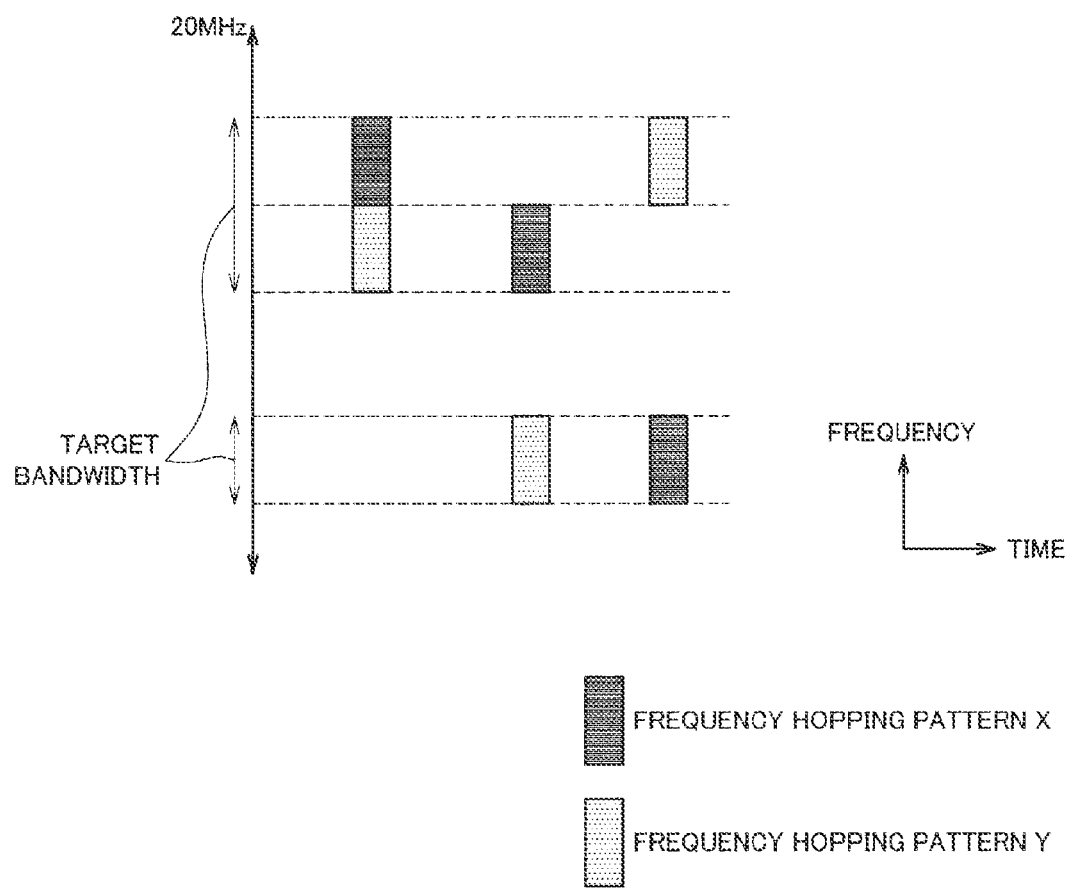
FIG. 16 is a diagram for describing frequency hopping of a type B SRS according to a second embodiment.

FIG. 16 is a diagram for describing the frequency hopping of the type B SRS according to the present embodiment. In the example illustrated in FIG. 16, the UE 200 transmits the type B SRS which has undergone the frequency bopping using a frequency hopping pattern X and the type B SRS which has undergone the frequency hopping using a frequency hopping pattern Y. As illustrated in FIG. 16, a plurality of used frequency bopping patterns are different from one another. The term "being different from one another" means that the hopping positions at the same timing are different from one another as illustrated in FIG. 16. Due to such a difference in the frequency hopping pattern, the occurrence of the collision can be prevented at least between the type B SRSs transmitted from the same UE 200.

On the other hand, the base station 100 (for example, the setting unit 151) sets a plurality of different frequency hopping patterns to be used for the transmission of the type B SRS in the UE 200. For example, the eNB 100 may set the frequency hopping pattern on the basis of the reception result of the type A SRS. Accordingly, the eNB 100 can cause the UE 200 to use a plurality of types of frequency hopping patterns including, for example, at least a frequency hopping pattern which has no or little influence of interference from an adjacent cell in a bandwidth at a frequency position having a good channel quality. Therefore, it is possible to further reduce the probability of the failure of beam tracking.

In addition, the frequency hopping pattern may be set by the UE 200 on the basis of the reception result of the CSI-RS transmitted from the eNB 100.

Further, in the example illustrated in FIG. 16, the individual hopped SRSs are transmitted at the same timing between the different frequency hopping patterns, but the present technology is not limited to this example. The timing may be shifted, for example, by adding an offset.

6. Application Examples

The technology according to the present disclosure is applicable to a variety of products. For example, a base station 100 may be realized as any type of evolved Node B (eNB) such as a macro eNB, and a small eNB A small eNB may be an eNB that covers a cell smaller than a macro cell, such as a pico eNB, micro eNB, or home (femto) eNB. Instead, the base station 100) may be realized as any other types of base stations such as a NodeB and a base transceiver station (BTS). The base station 100 may include a main body (that is also referred to as a base station apparatus) configured to control radio communication, and one or more remote radio heads (RRH) disposed in a different place from the main body. Additionally, various types of terminals to be discussed later may also operate as the base station 100 by temporarily or semi-permanently executing a base station function.

For example, a terminal apparatus 200 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The terminal apparatus 200 may also be realized as a terminal (that is also referred to as a machine type communication (MTC) terminal) that performs machine-to-machine (M2M) communication. Furthermore, the terminal apparatus 200 may be a radio communication module (such as an integrated circuit module including a single die) mounted on each of the terminals.

6-1. Application Examples Regarding Base Station

First Application Example

Figure 17:
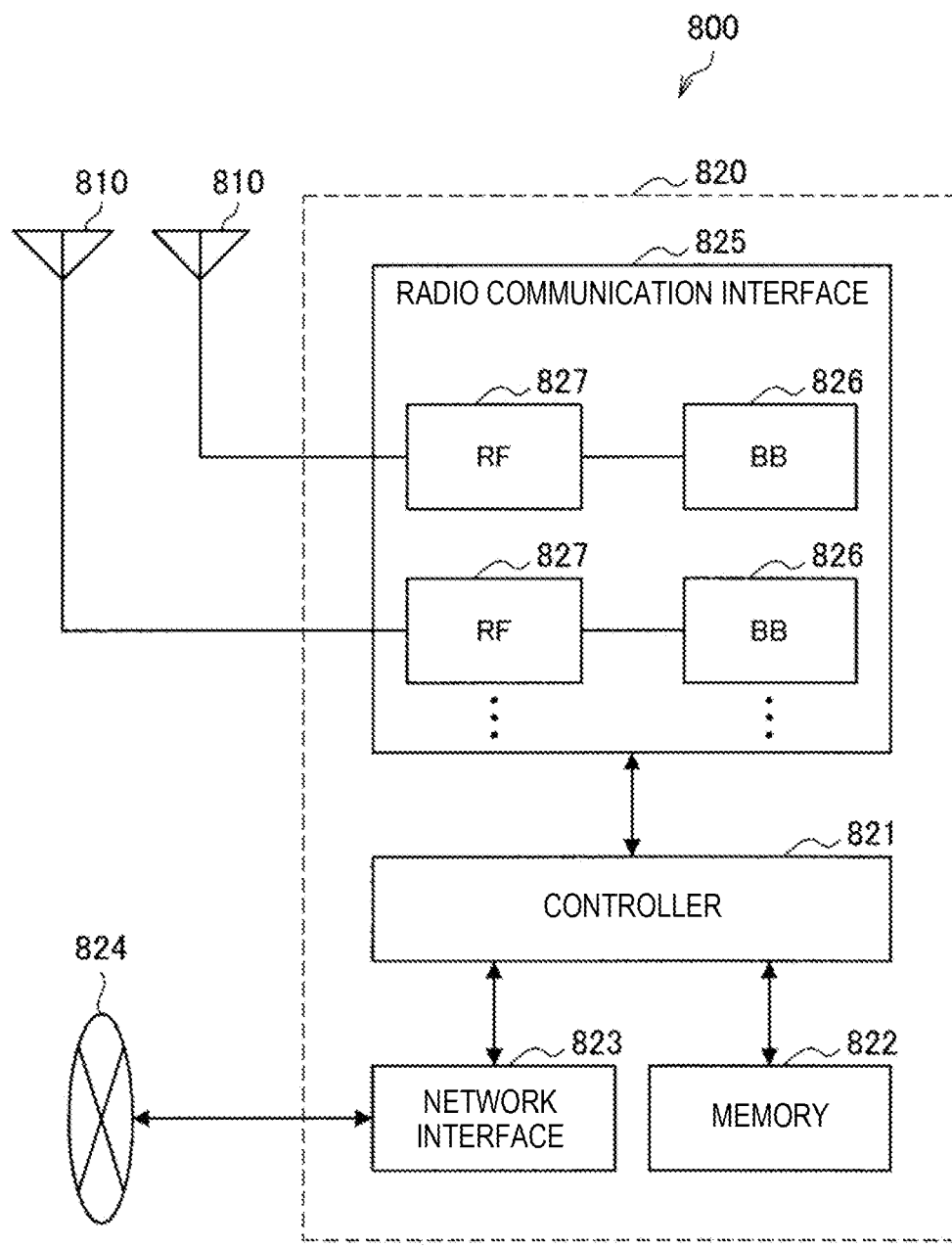
FIG. 17 is a block diagram illustrating a first example of a schematic configuration of an eNB.

FIG. 17 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in a MIMO antenna), and is used for the base station apparatus 820 to transmit and receive radio signals. The eNB 800 may include the multiple antennas 810, as illustrated in FIG. 17. For example, the multiple antennas 810 may be compatible with multiple frequency bands used by the eNB 800. Although FIG. 17 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed m corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface) The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 17. For example, the multiple BB processors 826 may be compatible with multiple frequency bands used by the eNB 800. The radio communication interface 825 may include the multiple RF circuits 827, as illustrated in FIG. 17. For example, the multiple RF circuits 827 may be compatible with multiple antenna elements. Although FIG. 17 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 17, one or more components (the setting unit 151 and/or the communication control unit 153) included in the control unit 150 or 250 described with reference to FIG. 7 may be mounted in the radio communication interface 825. Alternatively, at least some of such components may be mounted in the controller 821. As an example, in the eNB 800, a module including a port (for example, the BB processor 826) or all of the radio communication interface 825 and/or the controller 821 is installed and the one or more components may be mounted m the module. In this case, the module may store a program causing a processor to function as the one or more components (in other words, a program causing a processor to execute operations of the one or more components) and execute the program. As another example, a program causing a processor to function as the one or more components is installed in the eNB 800, and the radio communication interface 825 (for example, the BB processor 826) and/or the controller 821 may execute the program. As described above, the eNB 800, the base station apparatus 820 or the module may be provided as an apparatus including the one or more components, and a program causing a processor to function as the one or more components may be provided. In addition, a readable recording medium recording the program may be provided.

In addition, the radio communication unit 120 described with reference to FIG. 7 may be mounted in the radio communication interface 125 (for example, the RF circuit 827) in the eNB 800 shown in FIG. 17. In addition, the antenna unit 110 may be mounted in the antenna 810. In addition, the network communication unit 130 may be mounted in the controller 821 and/or the network interface 823. In addition, the storage unit 140 may be mounted in the memory 822.

Second Application Example

Figure 18:
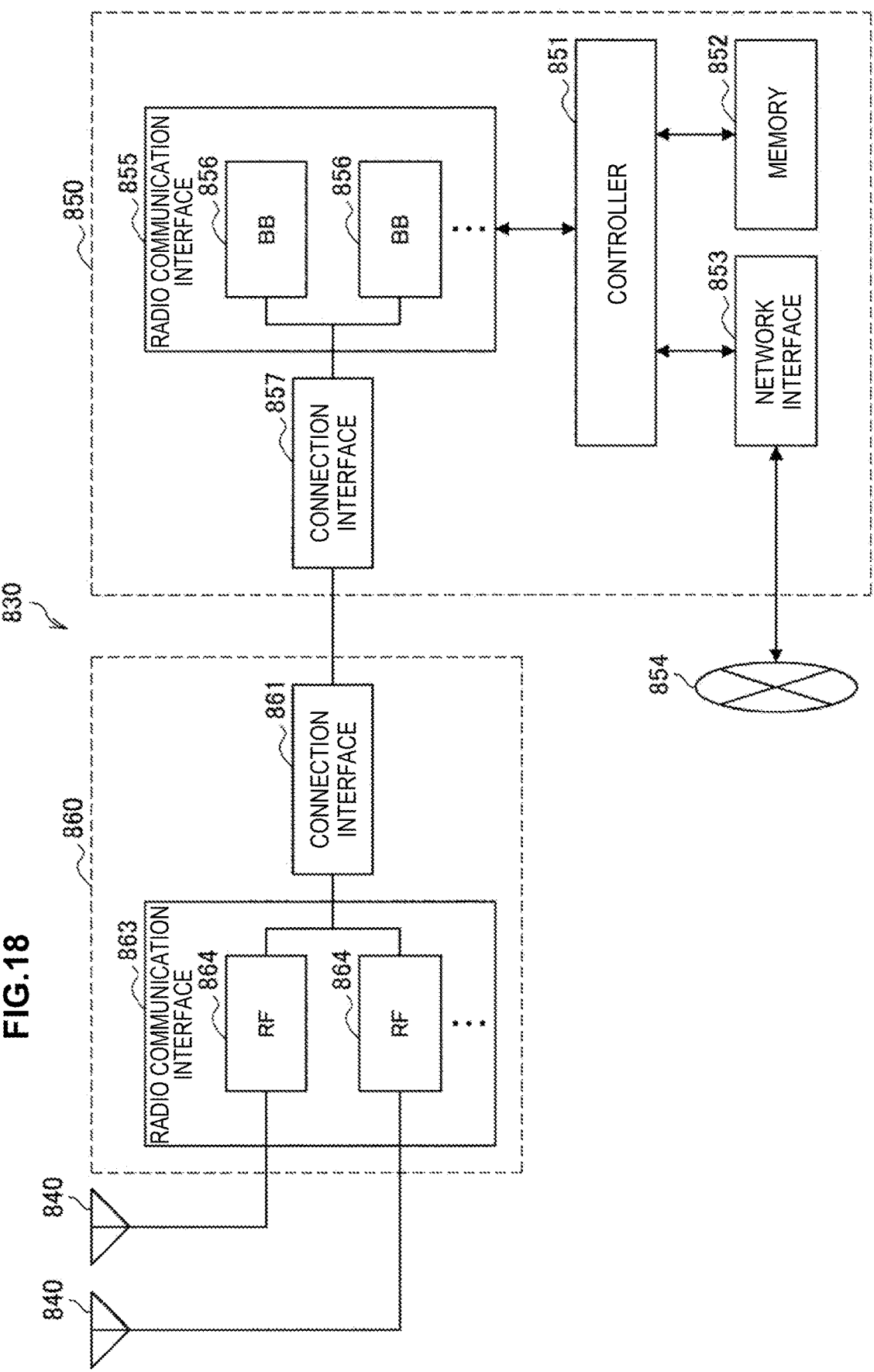
FIG. 18 is a block diagram illustrating a second example of a schematic configuration of an eNB.

FIG. 18 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in a MIMO antenna), and is used for the RRH 860 to transmit and receive radio signals. The eNB 830 may include the multiple antennas 840, as illustrated in FIG. 18. For example, the multiple antennas 840 may be compatible with multiple frequency bands used by the eNB 830. Although FIG. 18 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 17.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 17, except the BB processor 856 is connected to the RF circuit 864 of the RRH 860 via the connection interface 857. The radio communication interface 855 may include the multiple BB processors 856, as illustrated in FIG. 18. For example, the multiple BB processors 856 may be compatible with multiple frequency bands used by the eNB 830. Although FIG. 18 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 80.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 841). The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 18. For example, the multiple RF circuits 864 may support multiple antenna elements. Although FIG. 18 illustrates the example in which the radio communication interface 863 includes the multiple RF circuits 864, the radio communication interface 863 may also include a single RF circuit 864.

In the eNB 830 shown m FIG. 18, one or more components (the setting unit 151 and/or the communication control unit 153) included in the control unit described with reference to FIG. 7 may be mounted in the radio communication interface 855 and/or the radio communication interface 863. Alternatively, at least some of such components may be mounted in the controller 851. As an example, in the eNB 830), a module including a part (for example, the BB processor 856) or all of the radio communication interface 855 and/or the controller 851 is installed and the one or more components may be mounted in the module. In this case, the module may store a program causing a processor to function as the one or more components (in other words, a program causing a processor to execute operations of the one or more components) and execute the program. As another example, a program causing a processor to function as the one or more components is installed in the eNB 830, and the radio communication interface 855 (for example, the BB processor 856) and/or the controller 851 may execute the program. As described above, the eNB 830, the base station apparatus 85) or the module may be provided as an apparatus including the one or more components, and a program causing a processor to function as the one or more components may be provided. In addition, a readable recording medium recording the program may be provided.

In addition, for example, the radio communication unit 120 described with reference to FIG. 7 may be mounted in the radio communication interface 863 (for example, the RF circuit 864) in the eNB 830 shown in FIG. 18. In addition, the antenna unit 110 may be mounted in the antenna 840). In addition, the network communication unit 130 may be mounted in the controller 851 and/or the network interface 853. In addition, the storage unit 140 may be mounted in the memory 852.

6.2. Application Examples Regarding Terminal Apparatus

First Application Example

Figure 19:
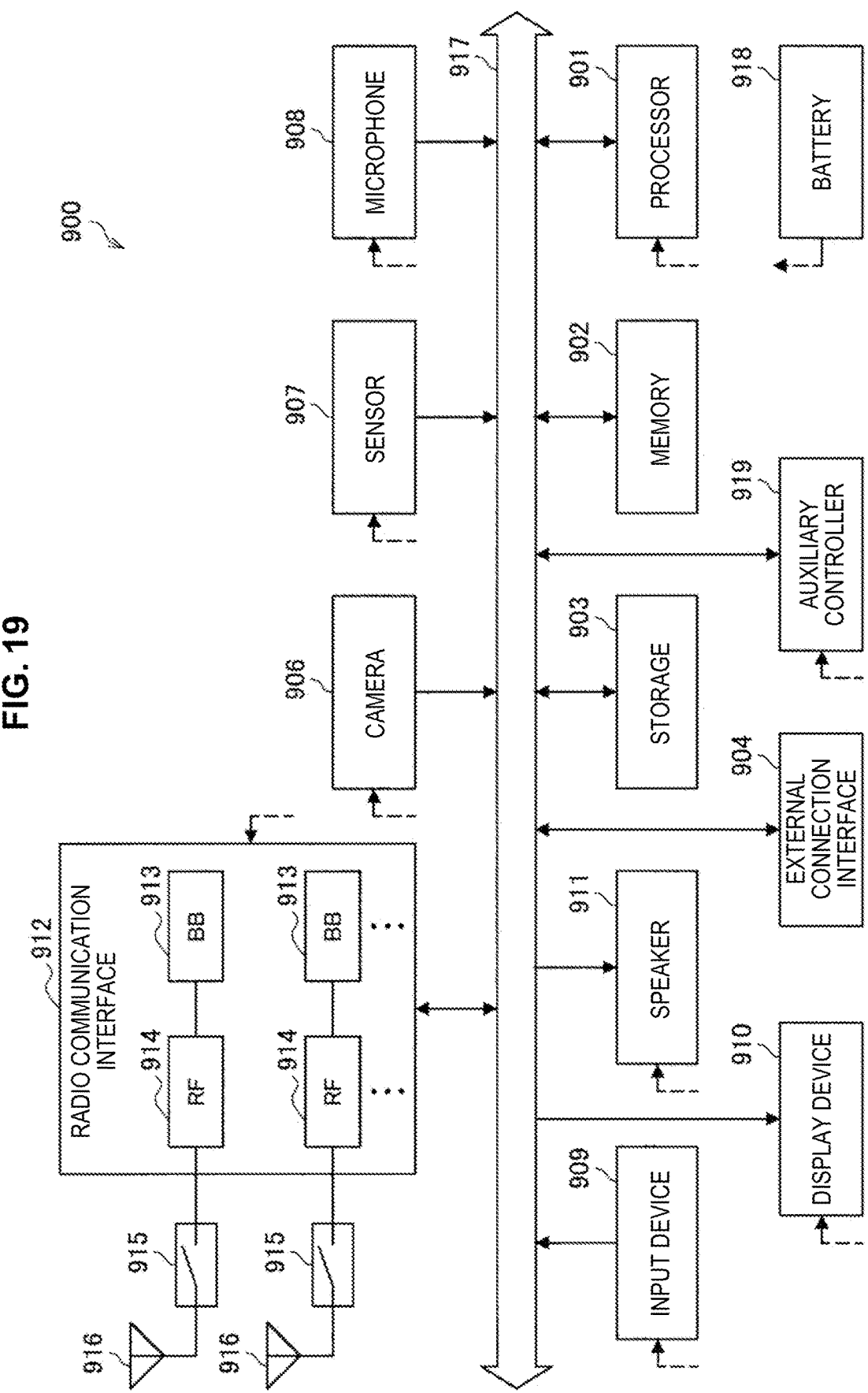
FIG. 19 is a block diagram illustrating an example of a schematic configuration of a smartphone.

FIG. 19 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE- Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a miter, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 19. Although FIG. 19 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in a MEM antenna), and is used for the radio communication interface 912 to transmit and receive radio signals. The smartphone 900 may include the multiple antennas 916, as illustrated in FIG. 19. Although FIG. 19 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 19 via feeder lines, which are partially shown as dashed lines in the figure. The auxiliary controller 919 operates a minimum necessary function of the smartphone 900, for example, in a sleep mode.

In the smartphone 900 shown in FIG. 19, one or more components (the setting unit 241 and/or the communication control unit 243) included in the control unit 240 described with reference to FIG. 8 may be mounted in the radio communication interface 912. Alternatively, at least some of such components may be mounted in the processor 901 or the auxiliary controller 919. As an example, in the smartphone 900, a module including a part (for example, the BB processor 913) or all of the radio communication interface 912, the processor 901, and/or the auxiliary controller 919 is installed and the one or more components may be mounted in the module. In this case, the module may store a program causing a processor to function as the one or more components (in other words, a program causing a processor to execute operations of the one or more components) and execute the program. As another example, a program causing a processor to function as the one or more components is installed in the smartphone 900, and the radio communication interface 912 (for example, the BB processor 913), the processor 901, and/or the auxiliary controller 919 may execute the program. As described above, the smartphone 900, or the module may be provided as an apparatus including the one or more components, and a program causing a processor to function as the one or more components may be provided. In addition, a readable recording medium recording the program may be provided.

In addition, for example, the radio communication unit 220 described with reference to FIG. 8 may be mounted in the radio communication interface 912 (for example, the RF circuit 914) in the smartphone 900 shown in FIG. 19. In addition, the antenna unit 210 may be mounted in the antenna 916. In addition, the storage unit 230 may be mounted in the memory 902.

Second Application Example

Figure 20:
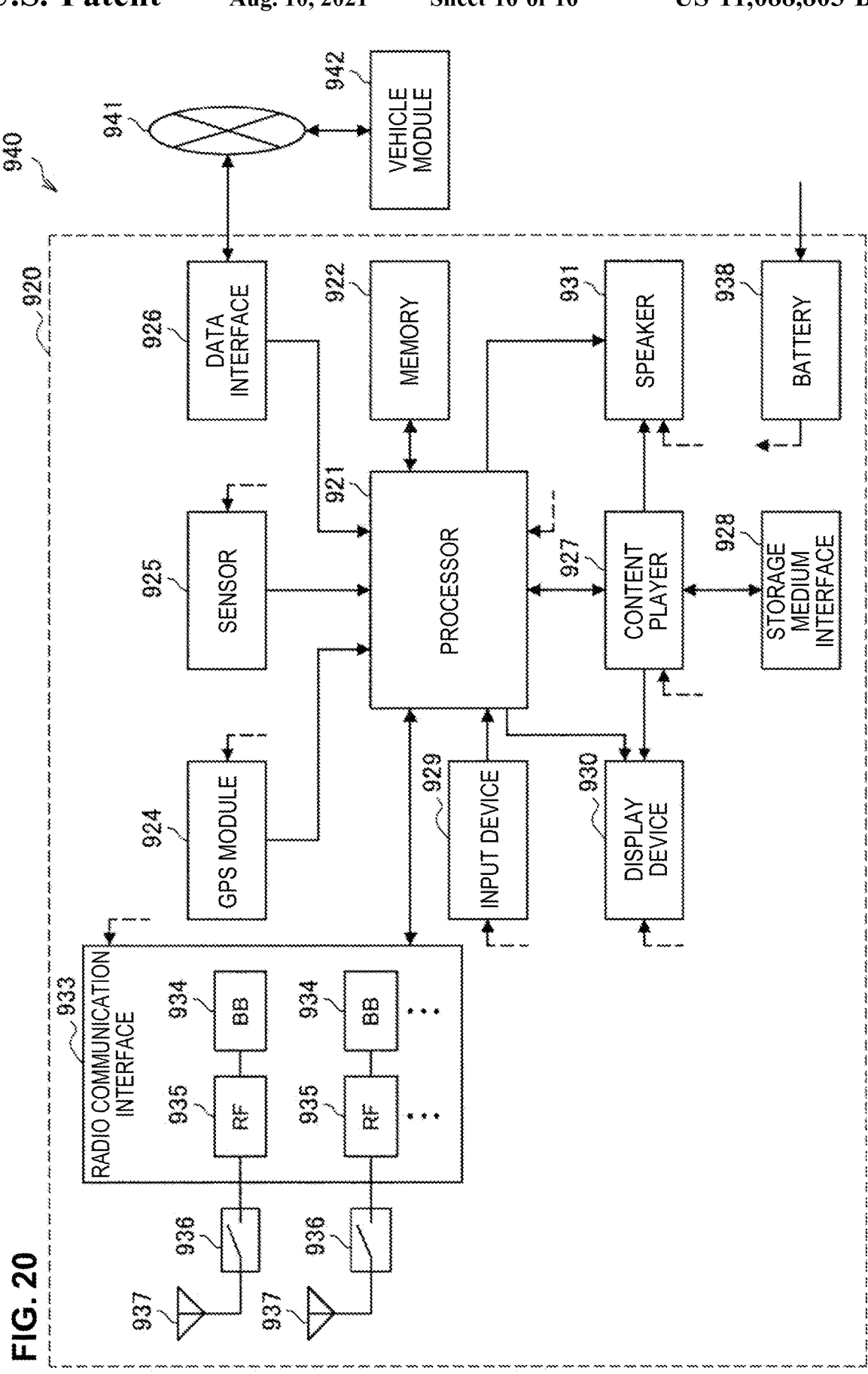
FIG. 20 is a block diagram illustrating an example of a schematic configuration of a car navigation apparatus.

FIG. 20 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920). The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as an LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 20. Although FIG. 20 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in a MIMO antenna), and is used for the radio communication interface 933 to transmit and receive radio signals. The car navigation apparatus 920 may include the multiple antennas 937, as illustrated in FIG. 20. Although FIG. 20 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 20 via feeder lines that are partially shown as dashed lines in the figure. The battery 938 accumulates power supplied from the vehicle.

In the car navigation apparatus 920 shown in FIG. 20, one or more components (the setting unit 241 and/or the communication control unit 243) included in the control unit 240 described with reference to FIG. 8 may be mounted in the radio communication interface 933. Alternatively, at least some of such components may be mounted in the processor 921. As an example, in the car navigation apparatus 920, a module including a part (for example, the BB processor 934) or all of the radio communication interface 933, and/or the processor 921 is to installed and the one or more components may be mounted in the module. In this case, the module may store a program causing a processor to function as the one or more components (in other words, a program causing a processor to execute operations of the one or more components) and execute the program. As another example, a program causing a processor to function as the one or more components is installed in the car navigation apparatus 920, and the radio communication interface 933 (for example, the BB processor 934), and/or the processor 921 may execute the program. As described above, the car navigation apparatus 920, or the module may be provided as an apparatus including the one or more components, and a program causing a processor to function as the one or more components may be provided. In addition, a readable recording medium recording the program may be provided.

In addition, for example, the radio communication unit 220 described with reference to FIG. 8 may be mounted in the radio communication interface 933 (for example, the RF circuit 935) in the car navigation apparatus 920 shown in FIG. 20. In addition, the antenna unit 210 may be mounted in the antenna 937. In addition, the storage unit 230 may be mounted in the memory 922.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the m-vehicle network 941.

7. Conclusion

One embodiment of the present disclosure has been described above in detail with reference to FIGS. 1 to 20. As described above, the terminal apparatus 200 according to the above embodiment communicates with the base station 100 which forms beams and performs communication, and transmits the first uplink reference signal and the second uplink reference signal which are narrower in the target frequency bandwidth and shorter in the transmission period than the first uplink reference signal. Accordingly, the base station 100 can perform beam tracking on the basis of the second uplink reference signal while acquiring the channel information of the entire operated bandwidth on the basis of the first uplink reference signal and performing scheduling. Here, since the frequency bandwidth serving as the target bandwidth of the second uplink reference signal is narrower than the entire bandwidth operated by the base station 100, the uplink overhead is reduced, and the efficient beam tracking can be implemented.

Further, the base station 100 according to the above embodiment forms beams and performs communication with the terminal apparatus 200, and performs reception of the first uplink reference signal from the terminal apparatus 200 and the second uplink reference signal which are narrower in the target frequency bandwidth and shorter in the transmission period than the first uplink reference signal and transmission of the first setting information for the second uplink reference signal to the terminal apparatus 200. Accordingly, it is possible to cause the terminal apparatus 200 to transmit the second uplink reference signal using an appropriate transmission setting, and thus the efficient beam tracking is implemented.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the techniques described above may be appropriately combined. For example, the UE 200 may perform the transmission setting of the type B SRS on the basis of both the setting information from the eNB 100 and the reception result of the CSI-RS.

Note that it is not necessary for the processing described in this specification with reference to the flowchart to be executed m the order shown in the flowchart. Some processing steps may be performed in parallel. Further, some of additional steps can be adopted, or some processing steps can be omitted.

In addition, the effects described m the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)
A terminal apparatus, including:
a communication unit configured to perform communication with a base station configured to form beams and perform communication; and
a control unit configured to transmit a first uplink reference signal and a second uplink reference signal which has a narrower target frequency bandwidth and a shorter transmission period than the first uplink reference signal.

(2)
The terminal apparatus according to (1), in which a plurality of the second uplink reference signals are periodically transmitted at a same frequency position.

(3)
The terminal apparatus according to (2), in which the second uplink reference signals are transmitted at intervals of 5 milliseconds to 10 milliseconds.

(4)
The terminal apparatus according to any one of (1) to (3), in which the second uplink reference signal is used for beam tracking by the base station.

(5)
The terminal apparatus according to any one of (1) to (4), in which the first uplink reference signal uses an entire frequency bandwidth in which the communication with the base station is able to be performed as a target bandwidth, and the second uplink reference signal uses a part of the frequency bandwidth in which the communication with the base station is able to be performed as a target bandwidth.

(6)
The terminal apparatus according to any one of (1) to (5), in which the control unit performs a transmission setting for the second uplink reference signal on the basis of first setting information received from the base station.

(7)
The terminal apparatus according to any one of (1) to (5), in which the control unit performs a transmission setting for the second uplink reference signal on the basis of a downlink reference signal received from the base station.

(8)
The terminal apparatus according to any one of (1) to (7), in which the control unit transmits the second uplink reference signal while performing frequency hopping on the second uplink reference signal in the target frequency bandwidth.

(9)
The terminal apparatus according to (8), in which the control unit transmits second setting information related to the frequency hopping to the base station.

(10)
The terminal apparatus according to (8) or (9), in which the control unit multiplexes each of a plurality of the second uplink reference signals using different frequency bopping patterns.

(11)
A base station, including:
a communication unit configured to form beams and perform communication with a terminal apparatus; and
a control unit configured to perform reception of a first uplink reference signal and a second uplink reference signal which has a narrower target frequency bandwidth and a shorter transmission period than the first uplink reference signal from the terminal apparatus and transmission of first setting information for the second uplink reference signal to the terminal apparatus.

(12)
The base station according to (11), in which the control unit transmits the first setting information corresponding to a reception result of the first uplink reference signal.

(13)
The base station according to (12), in which the first setting information includes information indicating a frequency position of a frequency bandwidth serving as a target bandwidth of the second uplink reference signal.

(14)
The base station according to (13), in which the control unit sets the frequency position of the frequency bandwidth serving as the target bandwidth of the second uplink reference signal on the basis of a reception result of the first uplink reference signal.

(15)
The base station according to any one of (12) to (14), in which the first setting information includes information indicating a transmission period of the second uplink reference signal.

(16)
The base station according to any one of (12) to (15), in which the control unit sets a plurality of different frequency hopping patterns used for transmission of the second uplink reference signal.

(17)
A method, including:
performing communication with a base station configured to form beams and perform communication; and
transmitting, by a processor, a first uplink reference signal and a second uplink reference signal which has a narrower target frequency bandwidth and a shorter transmission period than the first uplink reference signal.

(18)
A method, including:
forming beams and performing communication with a terminal apparatus, and
performing, by a processor, reception of a first uplink reference signal and a second uplink reference signal which has a narrower target frequency bandwidth and a shorter transmission period than the first uplink reference signal from the terminal apparatus and transmission of first setting information for the second uplink reference signal to the terminal apparatus.

(19)
A recording medium having a program recorded thereon, the program causing a computer to function as:
a communication unit configured to perform communication with a base station configured to form beams and perform communication; and
a control unit configured to transmit a first uplink reference signal and a second uplink reference signal which has a narrower target frequency bandwidth and a shorter transmission period than the fast uplink reference signal.

(20)

A recording medium having a program recorded thereon, the program causing a computer to function as:
a communication unit configured to form beams and perform communication with a terminal apparatus; and
a control unit configured to perform reception of a first uplink reference signal and a second uplink reference signal which has a narrower target frequency bandwidth and a shorter transmission period than the first uplink reference signal from the terminal apparatus and transmission of fast setting information for the second uplink reference signal to the terminal apparatus.

REFERENCE SIGNS LIST 1 system
100 base station
110 antenna unit
120 radio communication unit
130 network communication unit
140 storage unit
150 control unit
151 setting unit
153 communication control unit
200 terminal apparatus
210 antenna unit
220 radio communication unit
230 storage unit
240 control unit
241 setting unit
243 communication control unit

The invention claimed is:

1. A terminal apparatus, comprising:
a transceiver configured to perform communication with a base station configured to form beams and perform communication; and
a processor configured to:
transmit a first uplink reference signal followed by a first plurality of second uplink reference signals, each of the first plurality of second uplink reference signals having a narrower target frequency bandwidth and a shorter transmission period than the first uplink reference signal;
retransmit the first uplink reference signal in accordance with a first transmission period;
receive a response to the retransmitted first uplink reference signal; and
transmit a second plurality of second uplink reference signals, each of the second plurality of second uplink reference signals having the narrower target frequency bandwidth and the shorter transmission period of the first plurality of second uplink reference signals,
wherein, based on the received response, the processor sets a frequency position of the second plurality of second uplink reference signals to be different from a frequency position of the first plurality of second uplink reference signals, and
wherein the first and second pluralities of second uplink reference signals are used for beam tracking by the base station.

2. The terminal apparatus according to claim 1, wherein the first plurality of second uplink reference signals are periodically transmitted at a common first frequency position, and
wherein the second plurality of second uplink reference signals are periodically transmitted at a common second frequency position.

3. The terminal apparatus according to claim 2, wherein a plurality of different frequency hopping patterns are used for transmission of at least one of the first and second pluralities of second uplink reference signals.

4. The terminal apparatus according to claim 2, wherein the first and second pluralities of second uplink reference signals are transmitted at intervals of 5 milliseconds to 10 milliseconds.

5. The terminal apparatus according to claim 1, wherein the first uplink reference signal uses an entire frequency bandwidth in which the communication with the base station is able to be performed as a target bandwidth, and the each of the first and second pluralities of second uplink reference signals use respective subsets of the frequency bandwidth in which the communication with the base station is able to be performed as a target bandwidth.

6. The terminal apparatus according to claim 1, wherein the processor performs a transmission setting for the first plurality of second uplink reference signals on a basis of first setting information received from the base station in response to the first uplink reference signal.

7. The terminal apparatus according to claim 1, wherein the processor performs a transmission setting for the first plurality of second uplink reference signals on a basis of a downlink reference signal received from the base station in response to the first uplink reference signal.

8. The terminal apparatus according to claim 1, wherein the processor transmits the first and second pluralities of second uplink reference signals while performing frequency hopping on the first and second pluralities of second uplink reference signals in the target frequency bandwidth.

9. The terminal apparatus according to claim 8, wherein the processor transmits second setting information related to the frequency hopping to the base station.

10. The terminal apparatus according to claim 1, wherein the first and second pluralities of second uplink reference signals are frequency hopped according to a common first hopping pattern.

11. A base station, comprising:
a transceiver configured to form beams and perform communication with a terminal apparatus; and
a processor configured to:
receive, from the terminal apparatus, a first uplink reference signal followed by a first plurality of second uplink reference signals, each of the first plurality of second uplink reference signals having a narrower target frequency bandwidth and a shorter transmission period than the first uplink reference signal,
receive a retransmission of the first uplink reference signal in accordance with a first transmission period,
transmit a response to the retransmitted first uplink reference signal; and
receive a second plurality of second uplink reference signals, each of the second plurality of second uplink reference signals having the narrower target frequency bandwidth and the shorter transmission period of the first plurality of second uplink reference signals,
wherein, based on the transmitted response, a frequency position of the second plurality of second uplink reference signals is set to be different from a frequency position of the first plurality of second uplink reference signals, and wherein the first and second pluralities of second uplink reference signals are used for beam tracking by the base station.

12. The base station according to claim 11, wherein the first plurality of second uplink reference signals are periodically transmitted at a common first frequency position, and wherein the second plurality of second uplink reference signals are periodically transmitted at a common second frequency position.

13. The base station according to claim 11, wherein the first uplink reference signal uses an entire frequency bandwidth in which the communication with the terminal apparatus is able to be performed as a target bandwidth, and the each of the first and second pluralities of second uplink reference signals use respective subsets of the frequency bandwidth in which the communication with the terminal apparatus is able to be performed as a target bandwidth.

14. The base station according to claim 12, wherein the processor sets a plurality of different frequency hopping patterns used for transmission of at least one of the first and second pluralities of second uplink reference signals.

15. A method by a terminal apparatus including a transceiver and a processor, the method comprising:
transmitting, to a base station, a first uplink reference signal followed by a first plurality of second uplink reference signals, each of the first plurality of second uplink reference signals having a narrower target frequency bandwidth and a shorter transmission period than the first uplink reference signal;
retransmitting the first uplink reference signal in accordance with a first transmission period;
receiving a response to the retransmitted first uplink reference signal; and
transmitting a second plurality of second uplink reference signals, each of the second plurality of second uplink reference signals having the narrower target frequency bandwidth and the shorter transmission period of the first plurality of second uplink reference signals,
wherein, based on the received response, the processor sets a frequency position of the second plurality of second uplink reference signals to be different from a frequency position of the first plurality of second uplink reference signals, and
wherein the first and second pluralities of second uplink reference signals are used for beam tracking by the base station.

16. A method performed by a base station including a transceiver and a processor, the method comprising:
receiving, from a terminal apparatus, a first uplink reference signal followed by a first plurality of second uplink reference signals, each of the first plurality of second uplink reference signals having a narrower target frequency bandwidth and a shorter transmission period than the first uplink reference signal;
receiving a retransmission of the first uplink reference signal in accordance with a first transmission period;
transmitting a response to the retransmitted first uplink reference signal; and
receiving a second plurality of second uplink reference signals, each of the second plurality of second uplink reference signals having the narrower target frequency bandwidth and the shorter transmission period of the first plurality of second uplink reference signals,
wherein, based on the transmitted response, a frequency position of the second plurality of second uplink reference signals is set to be different from a frequency position of the first plurality of second uplink reference signals, and
wherein the first and second pluralities of second uplink reference signals are used for beam tracking by the base station.

17. A non-transitory recording medium having a program recorded thereon, the program causing a computer to perform the method of claim 15.

18. A non-transitory recording medium having a program recorded thereon, the program causing a computer to perform the method of claim 16.

* * * * *